(12) United States Patent
Monza et al.

(10) Patent No.: US 7,373,410 B2
(45) Date of Patent: May 13, 2008

(54) METHOD AND SYSTEM FOR PROVIDING ADAPTIVE AND PROACTIVE INTERACTION MANAGEMENT FOR MULTIPLE TYPES OF BUSINESS INTERACTIONS OCCURRING IN A MULTIMEDIA COMMUNICATIONS ENVIRONMENT

(75) Inventors: Joseph Vincent Monza, Cary, NC (US); Alan Wayne McCord, Walnut Creek, CA (US); David Hoyer Anderson, Hillsborough, NC (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 1077 days.

(21) Appl. No.: 10/441,865

(22) Filed: May 15, 2003

(65) Prior Publication Data
US 2004/0081183 A1    Apr. 29, 2004

Related U.S. Application Data

(63) Continuation-in-part of application No. 10/289,581, filed on Nov. 6, 2002, which is a continuation-in-part of application No. 10/279,435, filed on Oct. 23, 2002.

(51) Int. Cl.
*G06F 15/16* (2006.01)
*G06F 9/46* (2006.01)

(52) U.S. Cl. ........................ 709/229; 718/104

(58) Field of Classification Search ................ 709/229; 718/104
See application file for complete search history.

(56) References Cited

U.S. PATENT DOCUMENTS 6,332,154 B2   12/2001   Beck et al.
2001/0024497 A1*   9/2001   Campbell et al. ...... 379/265.09

OTHER PUBLICATIONS

U.S. Appl. No. 10/289,581, Petr Makagon et al.
U.S. Appl. No. 10/279,435, Petr Makagon et al.

* cited by examiner

*Primary Examiner*—Meng Al T. An
*Assistant Examiner*—Kenneth Tang
(74) *Attorney, Agent, or Firm*—Central Coast Patent Agency, Inc.

(57) ABSTRACT

An object-oriented system for managing multiple media types in a communication center environment has a multimedia queuing system, a processor for processing events in the queue, an interaction server for selecting media type or event types, a resource manager for reporting availability of a resource access point, and a data store for storing client information about media types available to the client and historical information about success of past use of those media types. In a preferred application, the system processes and routes incoming events of known media type to access points defined as systems or agents based in part on media channel availability of the access point, and wherein the system selects a media channel or channels for certain events in queue that are not pre-dedicated as specific media type events but are generated outbound or internal proactive contact events. For proactive contact events, the system automatically selects a media channel for each event based on a combination of set preferences and predictions based on historical channel information relating to success channel connections to that client.

19 Claims, 9 Drawing Sheets

METHOD AND SYSTEM FOR PROVIDING ADAPTIVE AND PROACTIVE INTERACTION MANAGEMENT FOR MULTIPLE TYPES OF BUSINESS INTERACTIONS OCCURRING IN A MULTIMEDIA COMMUNICATIONS ENVIRONMENT

CROSS-REFERENCE TO RELATED DOCUMENTS

The present invention is a continuation in part (CIP) of a U.S. patent application Ser. No. 10/289,581 filed on Nov. 6, 2002 entitled "*Method and Apparatus for Providing Real-Time Communication Center Reporting Data to Third-Party Applications over a Data Network*", which is a CIP of a U.S. patent application entitled "*Method and Apparatus for Extending Contact Center Configuration Data for Access by Third-Party Applications over a Data Network*", Ser. No. 10/279,435, filed on Oct. 23, 2002, the disclosures of which are incorporated herein by reference. The present invention is also related to a U.S. Pat. No. 6,332,154 filed as Ser. No. 09/253,554 on Feb. 19, 1999 and issued on Dec. 18, 2001 entitled "*Method and Apparatus for Providing Media-Independent Self-Help Modules Within a Multimedia Communication Center Customer Interface*", disclosure thereof included herein by reference.

FIELD OF THE INVENTION

The present invention is in the field of telecommunication encompassing all existing sorts of interaction multimedia technology, and pertains more particularly to methods and a system enabling adaptive and proactive interaction management of business interactions associated with a multimedia communication center environment.

BACKGROUND OF THE INVENTION

Some rather recent and major developments in communications technology extend far beyond the traditional and long-lived environment of computer-telephony integration (CTI) as adapted chiefly for connection-oriented-switched-telephony (COST) interaction and routing. Today, communications and interactions can be presented in media formats supported by various software platforms and applications, including CTI applications and platforms, and can source from virtually any communications main or sub-network including the Public Switched Telephony Network (PSTN), the Internet, and all sorts of and combinations of connected sub-nets, both wireless and wired.

A system for providing communication center statistical, configuration, and other important business-related data to third party applications over a data network is known to the inventors and is described in disclosures referring to U.S. patent application Ser. Nos. 10/289,581 and 10/279,435 listed in the cross-reference section of this specification. The system has an object-oriented interfacing component that is an intermediate service point connected to the network between the communication center environment and third-party applications. The system also has a set of application programming interfaces for transforming and transmitting communication center statistical and configuration data from the hosting center to the intermediate service point and a set of application program interfaces for transmitting the communication center statistical and configuration data from the intermediary service point to the remote third-party applications. In a preferred embodiment the third-party application accesses the intermediate service point using the network and manipulates one or more Web services hosted within the service point to configure to receive by subscription statistical, configuration and other data about specific communication center entities described as objects including real time performance statistics and state information of those entities. In practice, Java-based data are sent to the service point from the center and used for instantiating at least one object-oriented data model. The model, described as an XML document, is rendered accessible in whole or part to a requesting third-party application or applications according to protocol used by the third-party application or applications.

U.S. Pat. No. 6,332,154 references and/or includes several other patent disclosures, the aggregate of which teach an object-oriented multimedia-based operating system termed a Customer Interaction Networked Operating System (CI-NOS) used in a multimedia communications center for managing all sorts of supported multimedia interactions both in and out bound. Using multimedia technologies and software, an object-oriented framework, and both multimedia and text-based data storage facilities, which are cross-reference able, the system enables seamless and ongoing interactions to be managed. The interactions themselves can employ various multimedia types, and the system further enables interaction tracking, monitoring, recovery and utilization of records and associated data to further refine system capabilities in routing and other management tasks. Custom multimedia interfaces, multi-media dialog threading engines and interfaces, object-oriented Graphic User Interfaces (GUIs) and queuing systems, and a host of other technologically advanced components operate together according to enterprise rules to enable the system.

Among other capabilities of the system in the patent referred to in the above paragraph, are capabilities for automated triggering of routing determinations where preferred media is selected for resulting interactions. In preferred embodiments interactions are recorded according to occurrence and are serially linked and can be referenced from a historical standpoint. The interactions conducted within the system environment proceed according to business processes and rules and may include links to other recorded interactions involving one or more of the parties of the business process of an instant interaction. The linked historical interaction records can be of the same or of other media types related to or not related to the current interaction.

Enterprise systems in general often include several diverse and separate systems that are pulled together using a multimedia-center platform as a base platform. These systems offer some integration in the area of productivity and are often referred to as enterprise integrated architectures (EIAs). One of the key strengths of any customer interaction system is interaction management.

Traditionally, interaction management within a communication center refers to recording and/or monitoring a live interaction ongoing between a customer and a center operative, typically a center agent. In the more advanced systems known to the inventors and referenced in the cross-reference section of this specification, interactions of any supported media can be monitored and recorded in such a way that the business flow for one or a series of transactions including all of the individual interactions are captured and are recoverable. In these more advanced systems authorized individuals can call up specific portions or entire chains of transactions or interactions by searching multimedia and text-based dialogue sequences to produce a customized object-oriented view of information they are looking for.

As an example, consider that agent Joe needs to review a historical record of a series of interactions relating to the purchase of a computer by a customer Tim. By entering the criteria of the customer name, purchase order and product number, all of the interactions that Tim conducted with the center that were related to the particular piece of business including the final transaction and any post-purchase interactions that occurred before the time that Joe initiated the search are recovered and presented to Joe as a graphical tree or object-oriented thread detailing the chain, with links to the actual stored media and complete text of the interactions. The fact that the chain represents multiple media types results from the unique ability of the customer interface of the system to enable the customer to select preferred media types for interaction. Therefore the capability for the client to pre-select a specific mode or modality for an interaction is already known to the inventors.

A limitation of the above-described system is that the customer must manually pre-set media preferences from offered media types at the time of interaction. If a customer prefers to interact in a preferred media type or types then he or she may set the interface to always respond in the given media types. The system may, in some cases automatically respond with a correct media type if a customer has already initiated an interaction with a specific media type and has no preferences set for a preferred media. The system described above is client interface intensive and could be further streamlined through enhancements in object orientation.

It has occurred to the inventors that an object-oriented system charged with managing customer interactions can be enhanced with new functionality that is not available in systems such as the systems described above. It has also occurred to the inventors that the definition of customer interactions should no longer be limited to single media sessions between two or more parties, but should be broadened to include multi-media sessions between two or more parties, the sessions happening concurrently between the parties.

It will be appreciated by one with skill in the art of interaction management that customer/center interactions are not the only type of interactions that occur within a communications center environment. Other types of interactions and interaction chains include those between business suppliers and business customers, those between third party applications and communication center applications, internal interactions between live personnel, and internal machine-to-machine interactions, internal machine-to-agent and agent-to-machine interactions, and other possible interaction mappings some of which may involve external sources. Furthermore, there are multiparty interactions such as chat, conferencing (video, audio), co-browsing applications, and the like. In this document the terms customer and client shall be understood to include, but not to be limited to, customers, employees, suppliers, partners, and the like.

It is desired that all possible interaction scenarios are recordable and recoverable and that the course of some interactions or interaction chains be automatically influenced by the occurrence of events that may relate to the business of the interaction or chain of interactions that are occurring or that will occur. Moreover, limiting media-type preferences to a client, in some cases, is not preferable to a communications environment host. For example, if a large number of clients of a communications center select all future interactions in the form of videophone for no specific reason, the costs of doing business could rise dramatically for the host. Although systems known in the art may provide a center with a capability to offer only media-types that it wants a client to use, a more dynamic solution is desired that provides some flexibility according to a rapidly changing business environment.

It is also desired that business transactions and various automated business processes, which may include many related interactions, are recordable as a chain of interactions. It is further desirable that the chain be quickly modified in terms of business process should some related event necessitate a redirection or modification of business elements.

Therefore, what is clearly needed is a system and method for proactively and adaptively managing all possible interactions and interaction chains occurring within a communications center environment including dynamic media selection capabilities of supported media types for current and future interactions between communicating parties and systems. A system such as this could streamline activity by managing media types during interaction, and by steering interactions along alternate courses according to business events, enterprise rules, or based on historical success/failure information.

SUMMARY OF THE INVENTION

In a preferred embodiment of the invention an object-oriented system for managing interactions of multimedia types in a communication center environment is provided, comprising a multimedia queuing system for queuing inbound, outbound, and internal communication events, a processor for processing events in the queue, an interaction server for selecting media type or types for a pending interaction or notification event, a resource manager for reporting agent availability in terms of media types available to the agent, and a data store for storing client information about media types available to the client and historical information about success of past use of those media types. The system is characterized in that the system processes and routes incoming events of known media type to access points defined as systems or agents based in part on media channel availability of the access point, the availability states reported to the system by the resource manager and wherein the system selects the media channel for certain events in queue that are not pre-dedicated as specific media type events.

In some preferred embodiments of this invention the communications environment includes one or more of a communications center, a telephony network, a wide-area-network, and a wireless access network. Also in many preferred embodiments the wide-area-network is the Internet network. In some embodiments the interactions comprise interactive sessions of more than one media type between an access point and one or more clients, and in some embodiments interactions comprise interactive sessions of more than one media type between one or more access points and a single client.

In some embodiments the interaction server triggers automatic outbound proactive events queued for delivery to clients at predefined steps of a modeled business process to which the clients are party, while in others events are triggered according to detection by the system of occurrence of a business related event or intercept or receipt of knowledge of a business related event that may affect outcome of a business process. Also in some embodiments the access point adds a media type or media types to a current interaction, the addition thereof processed in queue as an outbound event or events of the media type or types.

In still other embodiments the system overrides a media preference of a client in routing an event to an access point or in delivery of an outbound proactive event to the client. In yet other embodiments a modeled business process defines a generic series of required events for completing a transaction the modeled process becoming a personalized transaction through dynamic application of contact parameter objects, media type objects for defined events, and assigned access point objects, the contact objects and access objects defining parties to the transaction.

In some cases media channel selection includes selecting more than one media type for an interaction or notification event, and in some cases clients include business partners and third party applications and interaction is undertaken through a set of Web services hosted in a Web server. In still other cases all of the events queued are virtual events of unassigned media and all event processing including media assignment is performed while events wait in queue.

In another aspect of the invention a multimedia-capable queue for queuing virtual events incoming to, outbound from, or internal to a communications center is provided, comprising I/O port circuitry adapted for bi-directional communication with a queue processor, I/O port circuitry adapted for bi-directional communication with a CTI processor, I/O port circuitry adapted for bi-directional communication with an intelligent data router, and I/O port circuitry adapted for communication with an interaction server. The queue is characterized in that events queued therein are processed from a generic-event state to a routable-event state based on application of destination parameters, and media type or types for presentation of the event to an event destination to each event while in queue and wherein certain events are triggered events based on proactive and adaptive criteria.

In preferred embodiments of the queue I/O port circuitry defines more than one functioning I/O port for each port dedication. Also in preferred embodiments generic events are components of an interaction the interaction or a series thereof components of a process model defining a business process that has a starting point and an end point. In yet other embodiments optional components of the process model include contact objects, access objects, and media objects, applicable as attributes to events.

In still other embodiments of the queue the interaction server triggers automatic outbound proactive events queued for delivery to clients at predefined steps of a modeled business process to which the clients are party. Also in some embodiments the proactive events are triggered according to detection by the system of occurrence of a business related event or intercept or receipt of knowledge of a business related event that may affect outcome of the related process. In other embodiments the generic-event state may identify one initiating party of the event and intent or purpose of the event. In other embodiments the initiating party of the event, the receiving party of the event, and the intent or purpose of the event. In still other embodiments processed events include those of both synchronous and asynchronous media types.

In still another aspect of the invention a method for initiating a proactive event deliverable to a client, wherein the event is automatically assigned a preferred media type is provided, comprising steps of (a) recognition of a need for contacting the client during transaction of a business process that the client is party to; (b) generating a generic event object having client identification data and intent or purpose data for the event; (c) queuing the event for further processing and delivery to the client; (d) determining which supported media type or types the event will be presented in; (e) attaching the media type or types parameters to the event; and (f) executing the event for delivery.

In preferred embodiments, in step (a), a specific point in the process for contacting a client or clients is pre-set and a generic step in the process. Also in preferred embodiments, in step (a), a step for contacting a client or clients is inserted into the business process as a result of system intercept or knowledge of an event related to the outcome of the process. In other embodiments, in step (b), the generated event also included source data.

27. The method of claim 26 wherein the source data is agent or system identification data. In yet other embodiments, in step (b), the event is generated by an interaction server on behalf of a specific access point, the access point being an agent or automated system.

In yet other embodiments of the method, in step (c), the queued event is one of an outbound event or an internal event. In still other embodiments, in step (d), determination of media type or types is based on historical data related to success or failure of event delivery using various media types. In still other embodiments, in step (d), determination of media type or types includes consideration of client itinerary and alternate media type or types available according to real-time itinerary state of the client. In yet other embodiments, in step (e), an interaction server attaches the media parameters to the event.

In further embodiments of the method, in step (e), event execution is automatic when all required contact parameters and media parameters are attached. In still further embodiments, there is further a step (f) for automated execution of applications related to an attached media type or types owned by one or more access points associated with event delivery, the application or applications opened enabling immediate interaction with the recipient.

BRIEF DESCRIPTION OF THE DRAWING FIGURES

DESCRIPTION OF THE PREFERRED EMBODIMENTS

The inventors provide a system and method for dynamic management of interactions and interaction chains using proactive and adaptive methods. The method and system of the invention in preferred embodiments is described in enabling detail below.

Architectural Overview of Interaction Management System

Figure 1:
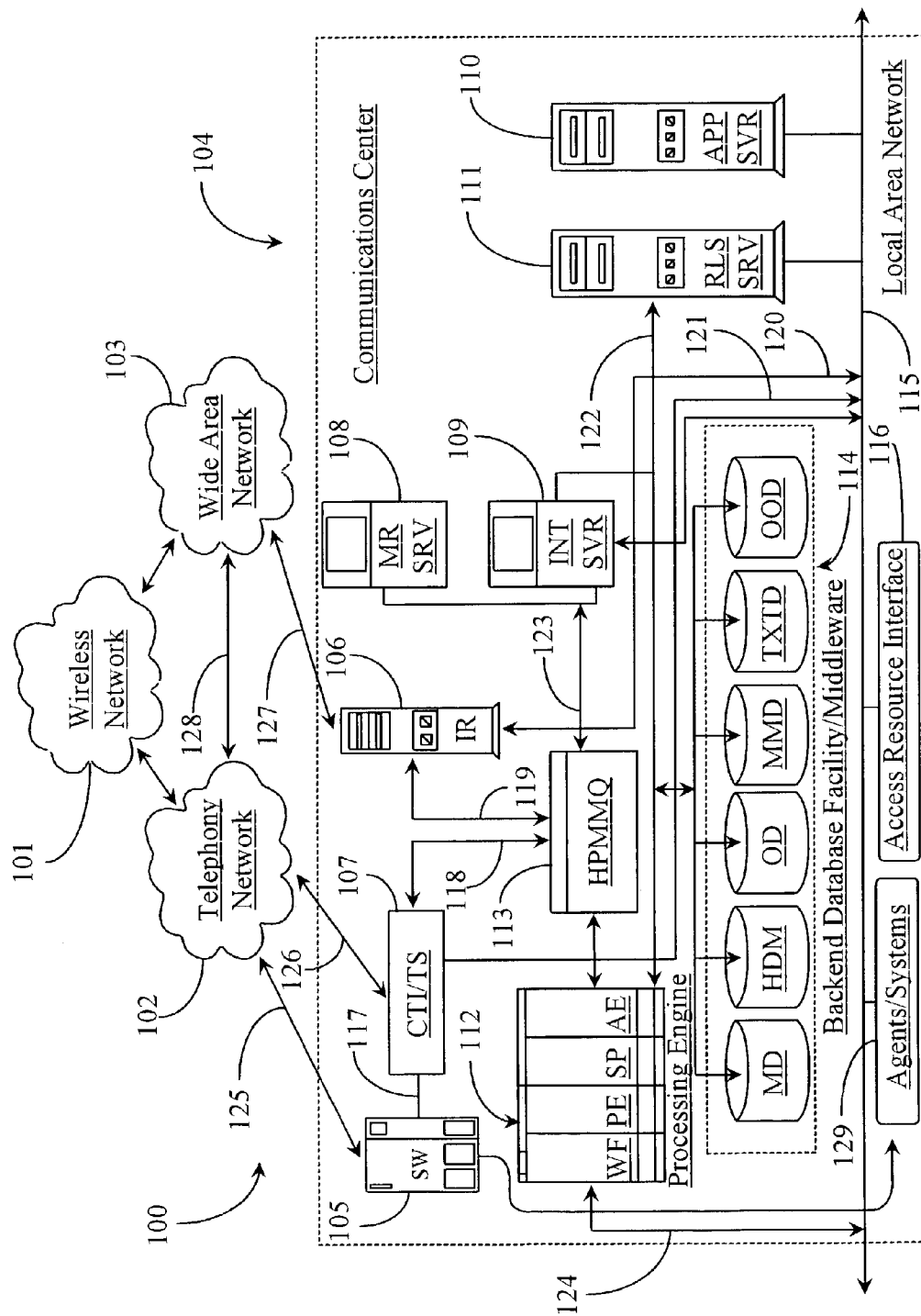
FIG. 1 is an architectural overview of an interaction management system according to an embodiment of the present invention.

FIG. 1 is an architectural overview of a communications network 100 enhanced with an interaction management system according to an embodiment of the present invention. Architecture 100 supports various communications networks including a wireless network 101, a telephony network 102, and a wide-area-network (WAN) 103. A Multi-Media Communications Center (MMCC) 104 is illustrated as a host of an enhanced object-oriented interaction management platform that is adapted to enable, among other tasks, dynamic management of interactions between entities of MMCC 104 and clients including business partners, suppliers or employees.

Wireless network 101 may be a cellular digital network or satellite-enhanced network for enabling access to MMCC 104 for users operating a wide variety of wireless network-capable devices. It may be assumed that network 101 contains all of the equipment and components like wireless gateways, etc. that are required in order to practice wireless Internet and/or telephony access. Network 101 typically has one or more gateways (not shown) into telephony network 102 and one or more gateways into WAN network 103. In some embodiments, network 101 has a gateway directly bridging wireless users to MMCC 104 and networks in place therein. Bi-directional arrows logically illustrate bridging capability into both networks 102 and 103 herein.

Telephony network 102 may be a PSTN, or any other type of private or public telephone network. Network 102 carries dedicated connection-oriented-switched-telephony (COST) events. Network 102 may be assumed to contain all of the required network equipment like service control points (SCPs), telephony switches, CTI-enhancement processors connected to switches, gateways into other networks and any other required equipment for practicing state-of-art telephony.

WAN network 103 is, in a preferred embodiment, the well-known Internet network. In other embodiments, WAN 103 may be a corporate or private network including an Intranet, Ethernet, or a bridged network of several sub-nets. The inventors prefer that WAN 103 encompasses the Internet network because of a high public-access characteristic and because of unlimited geographic boundaries. It may be assumed in this example that the enterprise hosting MMCC 104 also maintains network-based equipment within the domain of network 103 like one or more intermediate servers hosting Web services analogous to those described with reference to Ser. Nos. 10/289,581 and 10/279,435 listed in the cross-reference section of this specification.

Telephony network 102 and WAN 103 are bridged together for cross communication as is logically illustrated by a bi-directional arrow 128. Bridging capabilities may be implemented by any of several known gateways and bridging facilities known in state-of-art network bridging equipment. One with skill in the art will appreciate that in actual practice networks 102 and 103 do not have clear physical separation from one another in terms of carrier lines and equipment boundaries. A user may communicate with a destination connected to any of the illustrated networks from any other network through state-of-art bridging facilities.

MMCC 104 is illustrated in this example as a dually-capable MMCC, meaning that it may process at minimum both COST events and Data Network Telephony (DNT) events, which include a subset of DNT known generally as Internet Protocol Network Telephony (IPNT) events. DNT events also include those sourced from or terminated on wireless network 101 through a Wireless Application Protocol (WAP) gateway or other known gateways.

MMCC 104 has a telephony switch (SW) 105 provided therein and adapted to receive COST events directly from network 102 and to send COST events into network 102. SW 105 may be an automatic call distributor (ACD), a private branch exchange (PBX) or other type of known telephony switching apparatus. One or more COST telephony trunks, logically illustrated herein as a bi-directional arrow 125, provide dedicated network connection between SW 105 and a similar switch or routing point maintained in network 102 and local to MMCC 104. In alternative embodiments of the invention a telephony switch may not be present, and telephony events may still be managed and processed by VoIP over the appropriate network.

SW 105 is enhanced for routing intelligence by a CTI processor 107 running at least an instance of routing software. CTI processor 107 has connection to SW 105 through a CTI-link 117. Although it is not illustrated in this example, it may be assumed that in some embodiments a CTI processor similar to processor 107 is also provided within network 102 to enhance a local switch or service point having direct telephony connection to SW 105 by way of trunk(s) 125. In such an embodiment a separate digital link 126 is provided connecting processor 107 to the network processor so that routing intelligence and other MMCC functionality may be extended into network 102. Other intelligent peripherals (not shown) may be similarly provided at the level of network 102 such as interactive voice response (IVR) units and statistical-based server applications known to the inventors.

Using the above-described telephony network implementation, events arriving at SW 105 have already been interacted within network 102 and caller information has been sent ahead to one or more destinations within MMCC 104 often ahead of arrival of the actual COST event.

MMCC 104 has an intelligent data router (IR) 106 provided therein as a multi-media server and adapted to receive both synchronous and asynchronous multi-media events from network 103, and to create elements for a high-speed queue. IR 106 is adapted with all of the required network protocols to enable function as a continually active network node. IR 106 has connection to one or more enterprise-hosted Web-servers or other client-access servers maintained within network 103 by way of a network communications path logically illustrated as line 127. DNT events that are synchronous events include any event that requires a response in real time communication. An asynchronous event includes any events that do not require an immediate real-time response in order to maintain the state of the event. E-mail, voice-mail, Web-forms, Web-posts, and so on are asynchronous. Of course events may arrive at either SW 105 or IR 106 that are sourced from wireless network 101. The skilled artisan will recognize that the functions of server 106 may be combined with functions of one or more other servers, such as a media resource server labeled as element 108 in FIG. 1, functions of which are described in more detail later in this specification.

MMCC 104 has a plurality of agent stations and automated systems disposed therein and logically illustrated herein as agents/systems block 129. For a state-of-art communications center capable of multimedia event processing, a typical agent station includes a network-connected computer system with a graphic user interface (GUI), a COST telephone, and a host of communications applications executable on the computer system. In some cases various wireless peripherals like personal-digital-assistants (PDAs), Internet-capable telephones or headsets, pagers, cellular telephones, and the like compliment an agent's repertoire of communications devices that may be used in processing interactions. Executable applications running on an agent system may include e-mail, voice-mail, instant messaging, store and forward messaging services, voice conference applications, file share programs, Web-conference applications, electronic facsimile applications, and others.

Agents/systems 129 may be assumed to include many individual manned stations that may be grouped logically by product or business criteria or set-up as individual contact stations. There are many possibilities. Systems within agents/systems 129 may include automated systems that respond automatically to events without live intervention. Such systems include automated e-mail and facsimile systems, automated self-help applications, automated IVR functions, and so on. All agent workstations within block 129 are, in this example, connected to a local-area-network (LAN) 115. LAN 115 is adapted with all of the required network protocols, including transfer control protocol/Internet protocol (TCP/IP) to be enabled as an extension of or sub-net of network 103. In this example, LAN 115 enables agent stations for network communication including internal cross-communication using any of the available media types.

Agent stations 129 are connected to CO telephony switch 105 by internal telephony wiring to enable dedicated connections to agent COST telephones. Agent stations 129 are also connected through computer LAN connections to IR 106 via a network connection 120. Other agent communication devices such as IP telephones may also be LAN connected and may receive and send events through IR 106.

LAN 115 also supports an application server 110. Application server 110 hosts certain communications center applications shared by live agents. CTI processor 107 also has connection to LAN 115 by way of a connection 121. In this way information taken about callers and pending COST events may be routed to agent GUI interfaces before the actual COST calls are taken over telephones. LAN 115 may also support other servers and systems that are not illustrated in the example but are common in state-of-art centers like administration stations, knowledge bases, chat servers and so on. It will be apparent that these services may be shares as well by partners and suppliers.

The interaction management platform has a backend database facility and middleware component 114 that is adapted to warehouse data for MMCC 104. Data stored in facility 114 is mappable through middleware (not shown) to a common communication center business model including a generic interaction model. An interaction model is provided for the purpose of enabling efficient interaction management tasks in both proactive and in adaptive real-time business scenarios. The model (not illustrated) represents all of the functionality and media management capabilities of MMCC 104.

Data stored in facility 114 is logically segregated into different data types. For example, a Meta data (MD) component is provided for storing Meta data about products, services, customers, and other descriptive data. A historical data mart (HDM) is provided within facility 114 and stores historical data related to customer contact histories including success and failure statistics related to previous contact attempts using specific media types. An operational data store (OD) is provided within facility 114 and adapted to store all MMCC operational related data and history. A multimedia database (MMD) is provided and adapted to store records of all multimedia events that have occurred. A text-based database (TXTD) is provided for storing interaction threads containing text-based interactions and text renderings of the multimedia records stored in the MMD. An object-oriented database (OOD) is provided within facility 114 and adapted to store all of the communication center and enterprise business model objects and object components used to create and render dynamic front-end views that may be manipulated to alter or to extend functionality.

One with skill in the art will appreciate that facility 114 may, in one embodiment be a single storage facility having partitions to represent the differing data types. In another embodiment separate storage media are provided to store each differing data type. In one embodiment, facility 114 may be a legacy system. Further, the term multimedia database should be understood broadly to mean a data store in a multimedia call center or enterprise, not just a database that stores multimedia events or transactions. So such a database may store at some times and under some circumstances, just one type of media or transaction.

A high-performance multimedia queue (HPMMQ) 113 is provided within MMCC 104 and is adapted in this example as a virtual queue capable of optimal high-speed performance. Queue 113 is enhanced from a traditional middleware data queue because of its performance criteria. It is noted herein that in a preferred embodiment Queue 113 is a virtual queue wherein processing of events takes place by manipulating information associated with a token representing a specific event including type of event.

Queue 113 is a multimedia queue in the sense that all events including COST events that are processed either by systems or live agents are queued therein. In one embodiment, queue 113 is partitioned according to type of event. For example, all e-mail and voice mail events pending routing occupy an assigned portion or partition of queue 113 while all video/voice calls occupy another portion and so on. In this example, queue 113 also contains a portion for system-to-system events. In a preferred embodiment queue 113 also separates inbound events from outbound events. The term virtual queue is a term that implies that all real events are only represented in queue 113. However, some real events like system requests, Instant Messages (IMs), SMS messages, and so on may be queued therein and not simply represented by icon or token without departing from the spirit and scope of the present invention.

CTI processor 107 has a direct connection to queue 113 by way of a high-speed data link 118. IR 109 has a direct connection to queue 113 by way of a high-speed data link 119. When COST events arrive at CO switch 105 notifications of the waiting events are queued in queue 113 by processor 107 detecting the events. Some or all of DNT events and notifications are represented in queue 113. It is noted that as a router with connection to LAN 115, IR 106 may be adapted to directly route some events to agents or systems without queuing the events in queue 113. However, in practice of interaction management, all interaction capabilities of agent and systems are considered in terms of availability in real time for routing and in terms of triggering new interactions under proactive outbound and adaptive scenarios that may also be affected by enterprise rules. For this reason, it is preferred that all events of all media types are queued and managed in queue 113.

Queue 113 is a high performance queue in the sense that it is not a data queue (holding the actual event data) and in the sense that a powerful high-speed processor controls processing within queue 113. Queue 113 is processed using an optimized set of algorithms for skill-based routing and for load balancing scoring. Optimization enables the system of the invention to search and sort among a large volume of pending requests in queue 113 in a flexible and expedient manner. Optimization through algorithms also provides fast location of a best resource or interaction for each pending request.

A processing engine 112 is provided as part of the interaction management system of the invention and has direct connection to queue 113. Engine 112 is responsible for processing events in queue according to one or more of several criteria governed by real-time dynamics and enterprise rules. Engine 112 has direct access to all components within queue 113.

Engine 112 has a workforce management (WF) component that is dedicated to processing workforce assignments and distributing them to available agents, which may be local agents, but can be remote agents as well, or even field service workers distributed throughout the enterprise. This function requires considerable processing power because it is affected by real-time dynamics and metrics. For example, as agents begin processing specific events of certain media types their real-time event processing loads will change. Such changes may trigger the WF component of processing engine 112 to assign an additional media type or types for the agent to continue with while relieving the agent of another type. In this example, WF component within engine 112 generates internal system-to-system events or system-to-agent events to implement WF management events. The events once generated are distributed to the appropriate agents and systems through IR 106 as internal communication or directly to agents and systems by way of a direct connection 124 between processing engine 112 and LAN 115.

Engine 112 has a direct network connection 122 to a rules server (RLS SRV) 111. Server 111 is adapted to store and serve enterprise rules and, among other things, rules regarding WF management. WF component in engine 112 also has direct access to all of the data stores represented in facility 114 through the appropriate middleware. WF management data may be stored in OD (operational data store) identified by agent and or system. One reason for storing WF management data is so that assignment data and subsequent load calculations can be computed into results that may be used statistically to refine WF management assignments. Of course the goal is to assign a manageable amount of work without overloading or under loading system queues in any media type.

Processing engine 112 processes on an abstract level, meaning that it works to manipulate (in the case of WF) a work force management model that is a generic model except for processing manipulations. An object of the present invention is to provide model views that can be altered and modified to reflect specific states and state transitions in a real-time high-speed environment. In addition, medium and long-range forecasting based on stored data may be accomplished. A workforce assignment for a particular agent or a group of agents may also include automated system commands that enable triggering of specific applications from application server 110 and automated commands that enable or disable certain components at workstations, servers and automated communications systems themselves. Therefore WF component in engine 112 can also provide assignments to automated systems with no live intervention.

Engine 112 also has a proactive engine (PE) component adapted to provide proactive outbound contact management for clients of MMCC 104. An interaction can consist of a single real-time synchronous interaction using one media type or as a concurrent synchronous interaction using more than one media type. Moreover, a series of interactions that define an interaction chain can be thought of as a business process governed by rules. For example, there may be more than one synchronous interaction that is required to close a specific transaction. The initiation of the transaction and all of the actions that occurred before the close of the transaction can define a business process.

PE component within engine 112 uses knowledge of separate modeled "business processes" or "business chains" and contact history data to decide when in a business chain an appropriate outbound contact can be generated in synchronous or asynchronous media to help streamline the business chain by making it possible for the client to provide further input that may lead to a faster closing of a transaction, for example. To aid this function, HDM within facility 114 provides historical data about previous media specific outbound contact attempts and success or failure statistics of those events per customer or per transaction that may involve more than one party (several customers). HDM also has client preference data describing preferred media types and other etiquette preferences for contact purposes. In a preferred embodiment client itineraries are also considered in processing. For example, a client may have initiated a transaction, but then leave for a vacation. The client's vacation itinerary may include a preferred contact media type that may not be the normal preferred contact media of the client at work. The ability to dynamically select an optimum media type to use for a client contact to insure the best contact at any given time is termed adaptive interaction management by the inventors.

The core functionality is that the system can proactively trigger outbound interactions and/or notifications selecting specific synchronous or asynchronous media types and can adapt to events and changing scenarios wherein the proactive decision to trigger an interaction is made by the system and the specific media type or types for interacting are chosen by the system. Adaptive functions are functions that describe capabilities of the system to adapt to changing scenarios, detected events, and received or intercepted knowledge of events to provide intelligent contact determinations and "best media determination" for a contact given some objective.

Part of PE component within engine 112 is a self-learning component. The self-learning component enables proactive outbound contacts to be initiated using the most optimum media type and contact parameters to ensure the best chance for success of contact and probable response. For example, if a client like a business partner repeatedly does business with center 104 then all of his or her available media types, contact parameters, preferences, rules for etiquette, and normal itinerary, are stored in HDM within facility 114. Also stored in HDM under the same client ID parameters are statistical data regarding hit and miss rates of previous proactive outbound contacts and the result data of those contacts over an extended period of history. Over time, the system "learns" what the most successful proactive contact media types are and when the best times are to initiate the contacts. As more data is compiled more intelligence is gleaned.

A skills presence (SP) component is provided within engine 112 and adapted to optimize routing of interactions by injecting current skills presence data including available media "skills" into the routing process. While skill-based routing has been practiced and is known to the inventors, a novel component of SP within engine 112 is a component for learning not only basic agent skills, such as media type availability or skills such as bilingual capabilities, and knowledge of a product or service, but also for learning skills related to software application knowledge, proficiency in certain communications skills, multitasking capabilities in more than one media combination, and skills that may be acquired through external connections or sources maintained by a particular agent.

SP component within engine 112 calculates real-time skill levels of all available agents that could be a destination for any particular event in queue 113. After comparison the field is narrowed to one or two agents that posses the best skill rating for handling the specific event waiting. The system is self-learning in that as skill levels of agents increase in particular areas, or skills become obsolete due to applications switching (from old to new), the component avails itself of the latest data available in facility 114, perhaps in MD storage.

Agents initially report certain basic skill levels, and other skills are evaluated during periodic reviews. As an agent acquires higher skill levels and as new skills are acquired, the data is recorded and reused in skill-based routing. Skills can be discovered that are not traditional in the sense of skill-based routing but are derived from agent contacts and connections that can be external from the communications center such as access to knowledge bases, or access to additional service professionals known to the agent but not necessarily part of the communication center. One example might be that if an agent is particularly efficient using a search engine then he may receive "points" over another agent with mediocre search engine skills. The more experienced agent in data searching potentially can provide better information faster thus denoting a higher skill level.

Another unique component of processing engine 112 is an adaptive engine (AE). AE component within engine 112 is adapted to cooperate with the PE component to modify processes to react successfully to changes in business or workplace scenarios. For example, if a number of events within queue 112 are purchase requests for a specific product and the standard shipping time is included in a automated e-mail notification of "confirmed order" that goes out to all buyers, and a business event becomes known to the system that will affect the shipping time, then the AE component will cause the text of all of those automatically generated e-mails to be altered to reflect new estimated shipping periods for all current (in queue) and future buyers. Moreover, a proactive campaign using PE component is also undertaken to update clients who have already received e-mail confirmations with automatically triggered outbound contacts that provide the latest information. The outbound contacts do not necessarily have to be all e-mails. Depending on circumstances some of those contacts may be cell messages, automated IVR-based telephone calls, or notifications of other types of media.

An interaction server 109 is provided and adapted among other things to select and manage media types and knowledge resources reflecting past, present and future availability states of those resources and knowledge pools. Knowledge of available media and resource types is obtained from a media resource server 108 connected to server 109 by a high-speed data link. Interaction sever 109 has direct access to queue 113 and direct access to processor 112. Processor 112 processes from the queue using interaction server 109 as a resource. Interaction server 109 provides management presence information and state across the entire enterprise.

Server 109 is responsible for resource discovery and for providing routing intelligence used by IR 106. Server 109 is responsible for serving the intelligence for connecting the appropriate resources together at an appropriate time both in a real-time sense and in a future sense for time based interaction.

Server 109 hosts a resource collaboration service that is adapted to set up collaborative media session capabilities between more than one available resource including provision of the intelligence required for establishing the appropriate call and/or connection legs, which are, in a preferred embodiment modeled objects. Server 109 also maintains state of existing interactions taking place within the enterprise domain. Server 109 is also adapted to maintain active business and customer context during ongoing interactions recording and logging the information for history-based data storage.

Yet another service provided within server 109 is a service for setting up real-time conferencing sessions that focus on human collaboration required to resolve certain crisis issues and other important matters that must be resolved quickly. These sessions are set-up by server 109 in a proactive manner through outbound contact and invite mechanisms that may be of a variety of media types. These virtual sessions are maintained within the server in virtual meeting rooms termed enterprise-action-rooms (EARs) by the inventors.

It is important to note herein that server 109 provides the intelligence for media resource availability, connection parameters for routing and setting up collaborative interactions, as well as other intelligence required for processing requests from queue 113. However server 109 is not limited to being the only source of intelligence for enabling the functions of the platform. It is noted herein that responsibility for provision of data, presence information, and for maintaining states of interactions and recording interaction histories can be distributed among other functioning system components like processor 112 without departing from the present invention.

In one embodiment of the present invention HPMMQ 113 is adapted to queue "generic" outbound events wherein the best media type for the outbound event is automatically selected for the event after it is in queue. In this embodiment if a live agent has to contact a list of clients, for example, he or she can simply drag the list into a "queue representation" on his or her desktop application. This action causes all of the clients on the list to be queued as part of a real-time outbound contact campaign. Instead of the agent having to select a particular media type or picking up a telephone handset, the events are assigned the best media types by server 109 for the context of the situation and client data stored in HDM within facility 114.

In one embodiment all of the outbound events queued in HPMMQ 113 will be assigned a synchronous media type because an immediate response is required by the context of the interaction. In another embodiment a mix of synchronous and asynchronous media is used because an immediate reply may not be required for a specified period of time and client media preferences may differ. The different media-based interactions, if synchronous will be treated as incoming interactions on the agent side following all of the basic rules for incoming interactions. Of course, the events may be mixed in priority with other outbound campaigns that are running within the system. In this way both live interactions and system notifications can be made proactively without the agent having to select the media type.

Asynchronous media types that are part of the campaign can also "pop up" in order of queue state on the agent desktop for content filling and execution if they are not automatically generated messages. In another embodiment the agent may have a pre-set script that is used for all messages text or audio that are to be automatically generated.

In another embodiment of the present invention HPMMQ 113 can have incoming events sourced from a Web server maintained in WAN 103, which are generic incoming events or "a request for contact" of an unspecified media type. In this embodiment processing engine 112 and Interaction server 109 work together with facility 114 to come up with optimum media types for interaction based on client parameters and agent skills and availability. For example, if a client is interacting through a server maintained by the enterprise, the system can choose the best media type for the pending interaction after a queue position has been established.

In this aspect a media type may be selected for an outbound contact and connection to a live agent or automated system depending on need. At the Web interface, the client may input the reason for contact along with the generic request submission. If, for example, the reason is "I want to purchase" then an outbound telephone call may be established to the client cell phone number and the event in queue will be connected to a live agent once the client answers. The transaction can then occur.

As was previously described above, an interaction in a more complex form may include more than one simultaneous media type that co-executes during the interaction. For example, if the previously mentioned client's event is a "I want to purchase" and "need technical assistance", then a telephone contact and connection may result with an additional whiteboard session simultaneously established through the client and agent interfaces. In this way the agent has more interaction tools to aid in closing a transaction. The scenario may be that the agent receives a telephone call as an inbound call with the client waiting and also receives an automatic "execution" of a conference application that calls the clients computer application to establish the whiteboard session during the telephone interaction. There are many possibilities. In this embodiment neither the client nor the agent has to manually start any communications programs in order to interact.

As previously described, the interaction possibilities are modeled after supported applications in the center and applications that are known to be available at the client's end. All interaction objects are stored in an object-oriented database (OOD) within facility 114. Similarly, communication center call model objects, data reporting objects, system component objects, and other objects that make up the enterprise business model can be stored in OOD within facility 114. If the client is a business partner or supplier then typically they would have access to a set of groupware available that is duplicated on the system side. The groupware applications can be manipulated according to system directive based on client historical data and agent availability data (routing). The only human intervention is reduced to accepting the interaction and engaging in the business process. For business partners and suppliers who are largely mobile, secondary sets of communications applications are considered.

In an optional embodiment all interaction requests are interfaced through an access resource (AR) interface 116 connected to LAN 115. Resource interface 116, in this alternate embodiment, maintains of all of the current agent states like busy, ready, not ready, and so on including system media states available for each agent and system logged into the enterprise grid and processing from queue 113. Agent availability in this embodiment is determined in part by skill level assessment and in part by available media types. So if a client event in queue is determined to require a specific media type for a response or to complete a real-time request, then an agent having that type of media available and having appropriate skill level would be selected for routing. This embodiment reflects an example where some responsibilities of interaction server 109 may be distributed in this case to a resource interface.

Once an agent is interacting with a client using a specific media type, the agent may add media types to the interaction by opening another media channel through a drag and drop method on the agent user interface which would include a thin client application or plug-in of the interaction server 109. Additionally, an agent may request a transfer of the client to another agent using the same or another media type by submitting a transfer event request to access resource interface 116, which upon receipt will process the request according to next best match of an agent with the appropriate media type available. In one embodiment, the submitted transfer event is re-queued while the current interaction is ongoing. When the new agent is found by the system the ongoing event can be automatically terminated and re-established with the new agent. Moreover, conferencing with more than one agent may also be practiced. In these interactive scenarios, the system, more particularly interaction server 109, is responsible for setting up call legs required to "open" and "connect" clients to agents or automated systems. Considered criterion for adapting to a specific media for an event can include but is not limited to:

day-of-week
    time-of-day
    vacation
    location
    device type
    device properties
    device bandwidth
    current customer activity
    priority of required customer decision
    customer profile attributes The core of the media adaptive portion of the system of the present invention is a decision process and a historical database of previous delivery success/failure information. The decision process may consist of a "connectionist" decision making system such as an artificial or real neural network that uses the historical information to train itself to select the optimal channel to use to contact an individual in specific situations, times, urgencies and according to courtesy/etiquette rules. Alternatively, a simple decision process based on scores and weight factors of previous channel delivery success or failure rates could be used as well as probabilistic Bayesian methods.

High Performance Multimedia Queue

Figure 2:
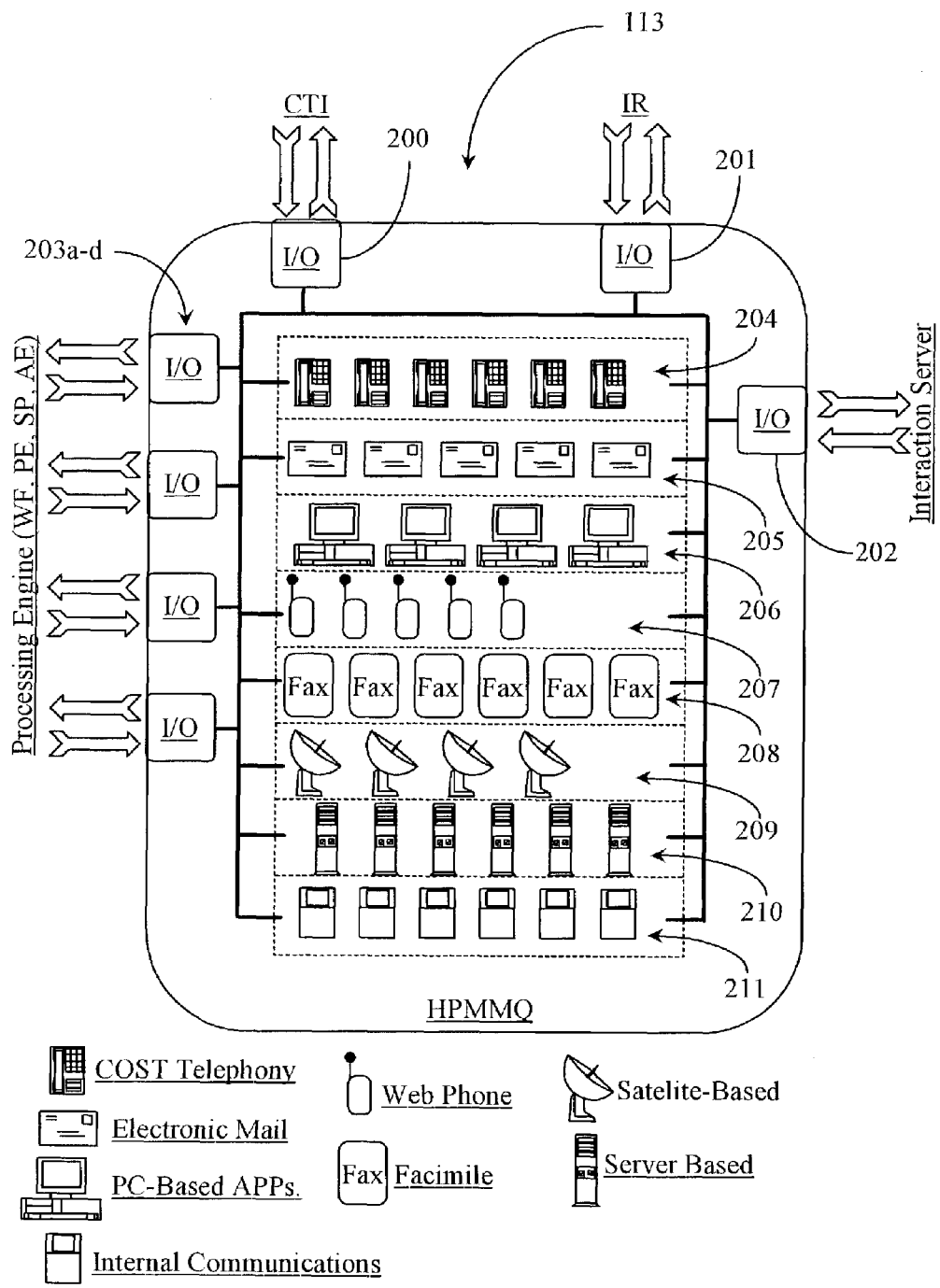
FIG. 2 is a block diagram illustrating a High Performance Multimedia Queue according to an embodiment of the invention.

FIG. 2 is a block diagram illustrating High Performance Multimedia Queue 113 of FIG. 1 according to an embodiment of the invention. HPMMQ 113 is, in a preferred embodiment, a virtual queue with pending multimedia events represented as icons or tokens. In this embodiment queue 113 is organized logically according to events of a same media type. The preferred organization by media type is not a requirement for practice of the present invention however because other queue-organization criterion can be applied.

Queue 113 in this particular example has an input/output I/O port 200 for CTI communication that applies to COST telephony events. I/O port 200 may be assumed to contain all of the required circuitry necessary for port communication and input/output of data. Queue 113 has an I/O port 201 adapted for communication with DNT routing systems like the IR system described with reference to FIG. 1 above. All DNT, including IPNT media events come in and out of queue 113 through port 201. In some embodiments of the invention only one of ports 201 and 200 will be necessary. One with skill in the art will appreciate that there may be more than one I/O port dedicated for COST telephony events as well as more than one port dedicated for DNT events without departing from the spirit and scope of the present invention. The inventors illustrate just one port each and deem the illustration sufficient for explanatory purpose.

Queue 113 has an I/O port 202 for enabling bi-directional communication with the interaction server described with reference to FIG. 1 above. Port 202 contains all of the required circuitry as was described with reference to ports 200 and 201. Queue 113 has I/O ports 203*a-d* for enabling bi-directional communication with processing engine 112 described with reference to FIG. 1 above. In this example there is one dedicated communication port for each component that provides processing services for events in queue.

Queue 113 has a portion 204 thereof dedicated for COST telephony events. Pending events for internal routing are illustrated as telephone icons as illustrated in a table located at the bottom of FIG. 2. In one embodiment all events in queue portion 204 may be incoming events. Another portion (not illustrated) may be provided and dedicated for outbound COST events. In another embodiment both incoming COST events and outbound COST events may occupy portion 204. As is typical, COST events are dedicated connections established by telephony switches therefore events represented in portion 204 of queue 113 are virtual.

Queue 113 has a portion 205 thereof dedicated to electronic mail events. Events of this type are asynchronous for the most part and include e-mails and voice mails represented herein with a mail icon. Similarly, portion 205 may also be used for other message carriers like IM. IM messaging can be considered a synchronous form of communication if practiced in real time as a continual communication flow consisting of a sequence of sent and received messages from the point of view of the client or of the center.

Queue 113 has a portion 206 dedicated for computer-based telephony and other computer installed communications programs excluding in this case e-mail. Computer icons represent events pending in portion 206. It will be appreciated that although the computer icons appear identical to one another, the actual media types of the pending events may vary somewhat. For example, one event may be an IP telephony request while another event may be a computer-based conference request using groupware.

Queue 113 has a portion 207 thereof dedicated to wireless telephony communication like cellular telephone or radio-telephone communication. An icon resembling a cellular telephone represents this type of event. Wireless device configurations may also include Laptop-based events, paging events, or events based-on other wireless devices or peripheral devices.

Queue 113 has a portion 208 thereof dedicated for facsimile transmission whether COST based or DNT based. In one embodiment, events that trigger an automated fax response are mixed in with those that request a human initiated fax in response.

Queue 113 has a portion 209 dedicated for satellite-based events like satellite telephone calls and other event types that can be initiated using satellite services. This embodiment assumes that the center itself hosts a wireless network for mobile knowledge workers, salesmen, or other authorized personnel. A satellite dish icon is used in this example to logically represent satellite-based communications.

Queue 113 has a portion 210 thereof dedicated for server-based interaction like chat interaction, Co-browsing sessions, Web conferencing, and the like. These types of events are typical of partner and supplier communications using a variety of automated and live services including the use of groupware for collaboration. A server icon is used in this example to represent server-based communication.

Queue 113 has a portion 211 thereof dedicated for internal system-to-system, agent-to-system, and agent-to-agent internal communication events that can take place using a variety of media. For example, internal COST calls between agents, internal machine requests and notifications, internal text messaging, etc. can qualify as internal communications. A simple messaging icon is used in this example to represent internal communications.

Queue 113 may be implemented according to any priority schemes that are designed by the enterprise hosting the system. In this embodiment all pending events in queue 113 are roughly identified according to media type from the viewpoint of an administrator looking at the available icons. However, exact media type of each event is distinguishable by attributes associated with each icon. The interaction model is generic until the exact media and event parameters and associated attributes are attached to it. In one embodiment all media types are established before event queuing takes place. For example, before a COST event appears in queue 113 the call parameters and media type of call is known.

However in another embodiment, the events in queue 113 are virtual events meaning that the event tokens in queue represent a pending communication event that will take place wherein no exact media type or complete connection parameters other than participant ID have yet been established. In this embodiment the parameters and the decision of the media that will be used are all decided while the event waits in queue. During this process the event "takes shape" according to system processing in queue and only after the particular attributes are attached, becomes a virtual representation of an actual event pending execution. This embodiment is enabled in an outbound theme in a preferred embodiment wherein an agent can initiate an outbound interaction and have the preferred media type and channel decided for him. However in another embodiment, incoming events in queue may be virtual events if sourced from an enhanced Web-portal or other client interface. The event is enabled when routing and media channel determinations are made. The system then makes the appropriate connections.

Queue 113 is logically represented herein to contain a bus structure that reaches every queue level so that conceivably every I/O port has access to any queue partition. All of the interaction building blocks (objects) for single and complex interaction types are stored in ODD within facility 114 described with reference to FIG. 1 above. Vertical applications are represented as generic business models having a basic construction that represents a standard business process consisting of one or more transactions. Exact models will depend of course on the nature of business conducted by the enterprise. The applications take on specific attributes in real-time as proactive interaction is enabled and adaptive considerations affect the flow of a transaction.

Queue 113 is a high-performance queue both in the sense that it is a virtual queue and in the sense that processing in queue occurs according to optimization through algorithm. Empirical testing using queue and processor simulations has shown successful processing speeds using various mixes of media types attributed to interaction requests. In actual practice of the invention, queue 113 and processor 112 described with reference to FIG. 1 above may be hosted in the same machine with interaction server 109.

It will be apparent to one with skill in the art that there may be more or fewer differing media types represented within queue 113 than are illustrated in this example without departing from the spirit and scope of the present invention. Those illustrated represent exemplary possibilities used for explanation of the present invention according to one of many different combinations of queue arrangement and media capabilities of the hosting system. Similarly, a single icon may in fact represent more than one media type wherein the actual model attributes ultimately define the routing parameters and media channel of any event in queue.

It is noted herein that once an event in queue 113 has been processed for routing determination and media channel a routing view or "snapshot" becomes available to any system component that requests such a view. Route views can be collectively viewed in one or more media types or by other criteria such as perhaps common routing destination. As interactions occur and are disposed of within the system, all interaction parameters including multimedia and text are captured and recorded and are recoverable using interactive interaction threads in an object-oriented manner as described with reference to U.S. Pat. No. 6,332,154 in description of CINOS. This process can be performed in a distributive fashion or centrally using the resources of interaction server 109 described with reference to FIG. 1 above.

An Interaction Management Engine

Figure 3:
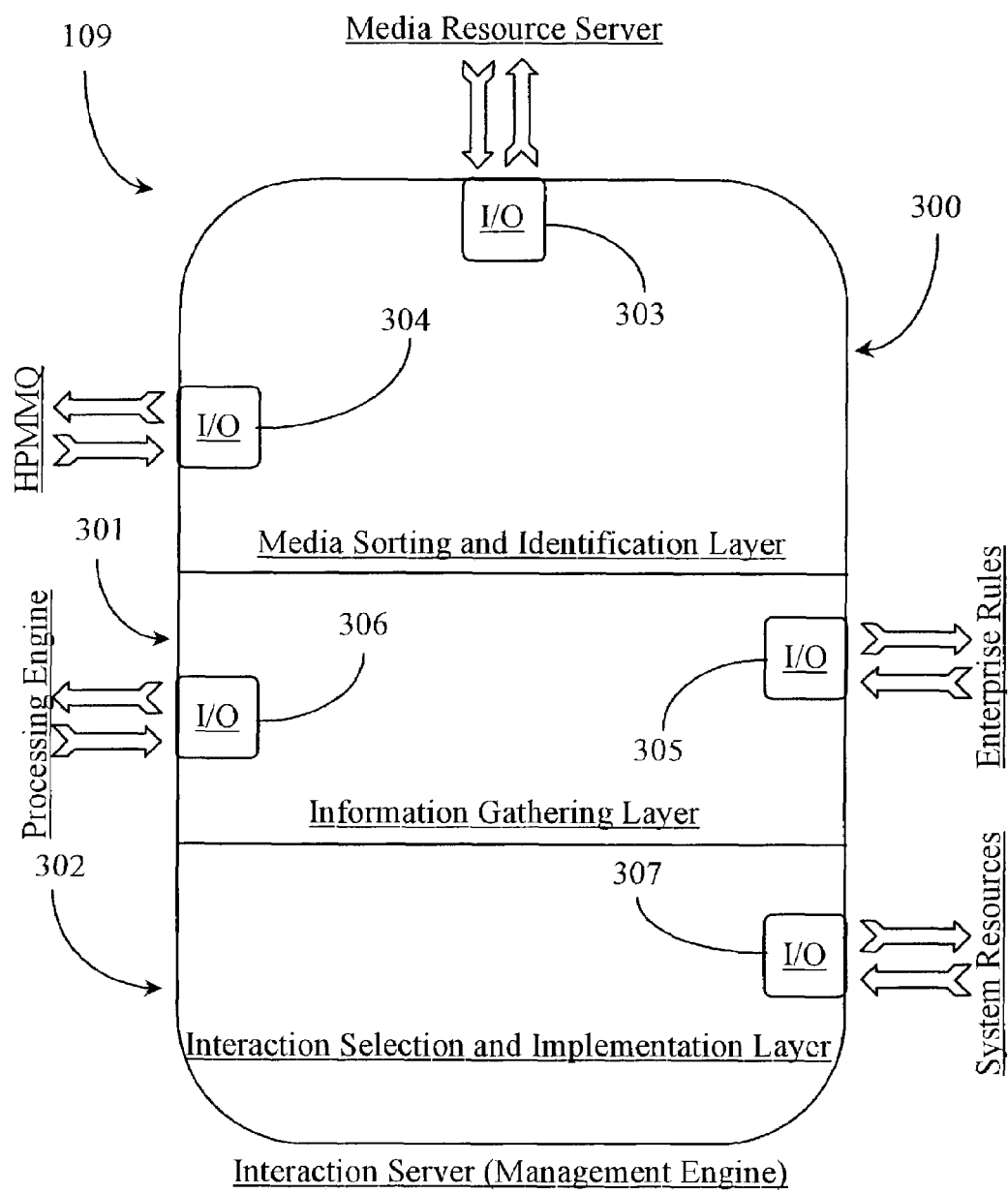
FIG. 3 is a block diagram illustrating an Interaction Management Engine according to an embodiment of the present invention.

FIG. 3 is a block diagram illustrating Interaction Server 109 of FIG. 1 according to an embodiment of the present invention. Server 109 provides media channel selection for pending events in queue as was previously described with reference to FIG. 1. While CINOS (U.S. Pat. No. 6,332,154) is a structured operating system and network with client interfaces and access portals, the system of the present invention is more a "platform" that streamlines much of the interface software and application program interface requirements of CINOS. The system of the invention provides complete modeled views of virtually every interaction and chain of interactions that may occur in communication with the enterprise.

Interaction server 109 is a machine-hosted software application that contains an interaction management engine (not shown) that performs the processing required to enable media channel attributes to be selected and applied to communication. A media sorting and identification layer 300 is provided within server 109 and is adapted to identify and sort between all available media that may be used in communication between an entity of the enterprise and a client. An information gathering layer 301 is provided within server 109 and is adapted to gather the required information for making a decision about which media channel or channels is optimal for any pending interaction.

As was previously described with reference to FIG. 1, server 109 provides the following services:

Resource presence and knowledge information
Resource Discovery/Routing intelligence
Collaboration Management
Interaction control
Context Maintenance
Media Channel Integration
Ad-Hoc Conferencing (EAR)

An I/O communication port 303 is provided within layer 300 of server 109 and is adapted to enable bi-directional communication with a media resource server illustrated with respect to FIG. 1 above as media resource server 108. Again, as described above, the functions of media resource server 108 may, in some embodiments, be combined with server 106, or even with other hardware platforms. The media resource server makes available all of the latest media parameters to the enterprise for any supported media type. If a new media channel becomes available or a previous media application is updated to a newer version, the media resource server is responsible for updating the same to server 109.

Server 109 has an information-gathering layer 301 adapted through I/O interface to gather needed information to enable a connectionist decision of what type of media to serve for a pending event. Server 109 has an I/O port 305 adapted to enable bi-directional communication with an enterprise rules server analogous to server 111 described with reference to FIG. 1. Server 109 also has an I/O port 306 adapted for bi-directional communication with a processing engine analogous to processing engine 112 described with reference to FIG. 1. Using the described I/O interfaces, layer 301 gathers any important information like skills assignment information, any proactive orders that may affect media type, and adaptive considerations that have been made, and any workforce management directives if the event for media selection is that type of event. In one embodiment, instead of communicating with the queue-processing engine directly for attributes concerning an event in queue, I/O 304 is used to obtain the information after it has been applied to the pending event. In other words, the attributes assigned to the event model are known before media channel selection is made.

Server 109 has an interaction selection and implementation layer 302 adapted for serving a command to assign a media channel to an interaction. The term interaction server is not literal in the sense that only a media type or types assignment is made for a current interaction pending in queue. Layer 302 has an I/O port 307 adapted for bi-directional communication with all other system resources for the purpose of issuing commands related to media channel selection and execution of the appropriate media types that will be used in the pending interaction. It is noted here that server 109 may simply assign an asynchronous notification for an outbound operation. In a more complex scenario, server 109 may initiate new events by selecting a media channel for an event pending and additionally, a second media channel to be used concurrently with the pending interaction. For example, an IP voice interaction can be supplemented with a "follow me" browsing session that is triggered as an additional event between the same client and an agent of the enterprise, the event spawning as the IP voice session ensues.

In addition to the processing layers of server 109, a section (not illustrated) is reserved for EAR session maintenance. In another embodiment, server 109 would only set up proactive EAR sessions but the actual complex interaction would be hosted in another server, perhaps a Web-server.

It will be appreciated by one with skill in the art that a media channel can enable any virtual event with a media type assignment of either a unidirectional nature or in a bi-directional interactive sense. For example, if a client calls into the communications center using a COST telephone, then the media type of the event is already known and represented in the virtual queue as a telephone icon before routing determination or other considerations are made for the pending interaction. However, it may be decided that a COST interaction will not be the optimal media type for engaging in the business process related to the initial call. Therefore, server 109 may make a decision that the caller and the center will be better served if an automated e-mail is sent immediately to the caller instead of a possibly long telephone interaction with a live agent. In this case the media type of the event is reassigned and IVR interaction can be used to inform the caller that an e-mail containing all of the requested information is on its way and may thank the caller for phoning in.

An interaction or business chain represents all of the interactions required for initiation and closing of a defined business transaction. A transaction can be simple like initiating a purchase request, submitting payment preferences, and confirming the order. However, the transaction may not be considered closed after confirmation. The product still has to be scheduled for shipment to the client and shipped to the client. Therefore, a business chain may include proactive post transaction(s) interaction with a client. A business chain may be much more complex than a simple transaction.

Interaction server 109 may be called upon to assign media to a proactive event triggered by an enterprise clock related to shipping or to maturity of an account, or to any other process that may be triggered according to a preferred time. In this case, an outbound event is triggered according to time constraints to be sent to a particular client or business partner. However, the client or partner may have a schedule that will render the timed interaction or notification ineffective. Interaction server 109 can access client data for information related to a preferred media type and contact parameters in the event of notification occurring at a specific time such as when according to known schedule a client is unavailable at a traditional contact parameter set. Therefore, server 109 may in some special cases also apply routing attributes in addition to a media channel for a pending proactive event that is a timed event or that is triggered by some adaptation by the system to a detected event.

Interaction server 109 is not required to select media types for all interactions that will occur within the communications center. Server 109 may be adapted to select media only for outbound events or a specific combination of outbound and inbound contact requests. Configurationally speaking there are many possibilities. It is possible though that all interactions that occur have the specific media types selected by the system instead of by agents or clients of the center.

Cooperation Between the Processing Engine and Multimedia Queue

Figure 4:
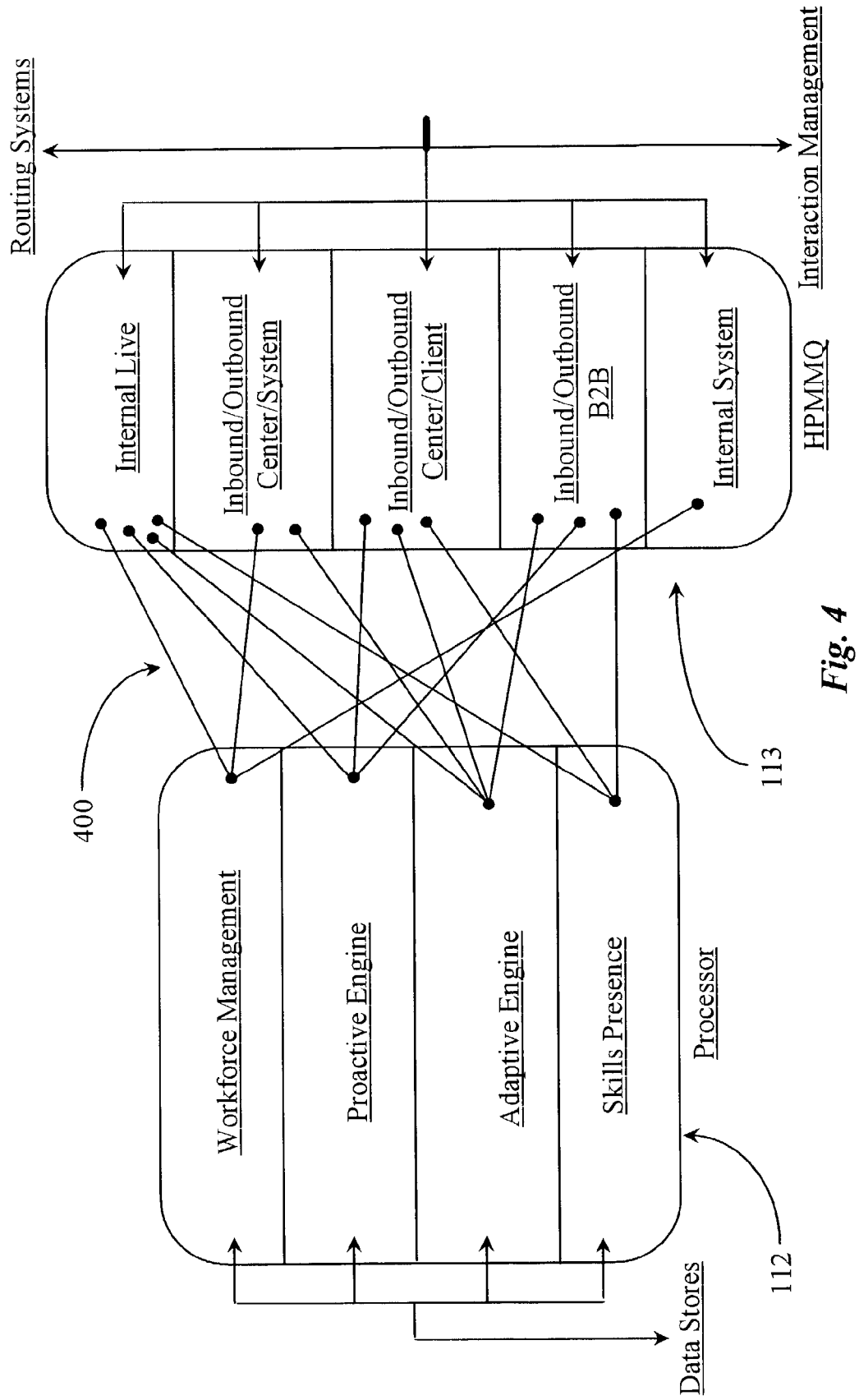
FIG. 4 is a block diagram illustrating cooperation between the processing engine and multimedia queue of FIG. 1.

FIG. 4 is a block diagram illustrating the processing engine and multimedia queue of FIG. 1. Processing engine 112 assigns specific attributes to events or "interactions" within queue 113 according to enterprise rules as previously described. Engine 112 can also instantiate new events having attributes that fall under proactive and adaptive rules. In this example, queue 113 has 5 partitions for organizing queued events. Reading from top to bottom the partitions are as follows:

Internal Live communications

Inbound/Outbound Center/System communications (automated)

Inbound/Outbound Center/Client communications (live or automated)

Inbound/Outbound business to business (B2B) communications (live or automated) and Internal system communications (automated)

Internal live communications are characterized by internal telephone calls, IP voice calls, internal collaborative applications, messaging, chat, and any other supported communications application that is considered a live communication tool. Workforce management issues, proactive contact issues, and skills presence issues can affect these communication events. The workforce management engine of processor 112 can initiate interactions that have a theme of conducting workforce management. Most of these interactions will be automated notifications of duty assignments or re-assignments, machine repair requests, and the like. Some workforce management interactions might be internal live interactions. For example, a supervisor may get a notification to contact agents of group A in the technology sector using a live medium and give them re-assignments. The re-assignments may be required for example, as a result of an e-mail server malfunction and the re-assignment might be to replace e-mail duties with COST telephone duties.

In one embodiment, a simple outbound notification may be triggered that will pop-up on each target agent computer screen, which would fall under the domain of internal system communications. However, to make sure everyone gets and understands the re-assignment, a series of live telephone calls might be triggered. The system has adapted to the event of a down server and has proactively triggered the notification calls. The supervisor charged with placing the calls may simply have to answer a series of "inbound calls" that are automatically triggered and queued as internal live events. Each one that is answered connects the supervisor to one of the targeted agents. The supervisor does not have to manually place the calls. Therefore the interactions are managed through the access resource server described with respect to FIG. 1.

Inbound/Outbound Center/System communications are automated notifications and request/response interactions initiated between communication center systems and externally held systems. Inbound/Outbound Center/System may also include B2B transactions. These events can be simple machine requests or notifications using machine language protocols or messaging that is machine-readable. These event types can be affected by workforce management issues, proactive contact issues, and by adaptive issues. An external system might be that of a supplier of goods that is set up to communicate and report to a center system like a supply chain management (SCM) system. If, for example, a shortage of on-hand product is detected by the enterprise, the system may trigger one or more outbound notifications, which seek to acquire more product through increased shipping for a specified period of time until the shortage no longer is detected. In such as case, a proactive outbound notification that interrupts the normal product flow chain is sent to one or more systems responsible for product inventory and delivery. The shipping numbers are automatically updated for the stated period after which normal shipping ensues.

Adaptively, the system could after a number of forced shipping increases have occurred, adjust the traditional quantity of product shipped over time to reduce instances of shortages. Workforce management might be triggered to initiate an outbound communication to seek or recommend increase in shipping personnel associated with the remote location in order to physically meet the higher demand for product.

Inbound/Outbound Center/Client communications represent live or automated communications of virtually any media type between the center and traditional clients like a customer base of repetitive customers. Proactive communication, adaptive communication and skills presence issues affect these types of events. The system maintains information about clients including itineraries, media types available to them, payment histories, contact information sets, and preferred media types for contact. New clients are automatically entered into the system and are surveyed for additional information used in proactive and adaptive scenarios. The skills presence engine provides skills routing information for incoming, and in some cases internal live events. The proactive engine provides preferred or time specific contact information for outbound notifications to clients that are machine automated or manually initiated. For example, if a specific product can no longer be offered with a certain feature but there are 20 clients that have already placed orders for the product with the feature then a proactive outbound notification campaign is launched to notify clients of the situation.

The notification campaign will not necessarily be conducted over the same media types because media types available to the clients vary as well as the times that they can be reached using the available media types. Furthermore, the enterprise rules may require live intervention because of the fact that there may be some cancelled orders. Perhaps another product exists that still has the feature and all of the basic function of the ordered product. In this case, the options are cancel the order, switch to the other product that still has the feature, or accept the current order without the promised feature. A live interaction would be best suited for mitigating the 20 transactions. When the outbound list is submitted for contact, the adaptive engine works with the interaction server to select the best "live" media available to the client under the circumstances and according to history. As a result, some of the calls will be telephone calls, some will be cellular calls, a few might be IP telephony calls, one or two may have to be automatically notified of the situation because no live media is available to them because at the time of contact they are mobile and have access to only a pager.

Media channels may be optimally selected according to priority in this case because of the circumstance and value of all of the existing orders. Those that have to be paged or notified by other than live synchronous media can be automatically notified by the system without agent intervention provided that the product number, purchase orders, and problem statement is known. Those paged will be provided with the agent's direct line number, the correct purchase order, and if voice activated, a short prompt stating there is a problem with your order.

Through proactive and adaptive interaction management clients are contacted using the optimal media to ensure successful objectives. The contact attempts are tracked by the system so that the agent is relieved of the responsibility. If the clients who were originally paged do not call in by a certain period of time then another contact attempt, perhaps using another media type will be made automatically.

Inbound calls from clients may in one embodiment be treated as normal inbound calls answered using the same media type as the call. In this case the events are queued virtually but the media type is a given and will be routed to an agent utilizing the same media type that is available. However, if the client is a repeat client whose available media types are known to the system, the system may make a recommendation to the client to switch media types for interaction based on the reason for contact, which may be elicited through IVR interaction. For example, if the client initiates a COST call to a live agent to check an order status, the IVR system may prompt the caller with an option to have the status e-mailed to his e-mail address and offer not to charge the client for the telephone call. The event in queue then is not routed but switched to an outbound e-mail, which is automatically generated with no agent intervention. Other media types may be offered depending on the clients' state and agent availability.

Inbound/Outbound B2B communications represent live and automated communication between the center and business partners, suppliers, and other third party systems or applications. Customer relations management (CRM), supplier relationship management (SRM), product chain management (PCM), product life-cycle management (PLM), and product value management (PVM) make up some of the types of automated systems that can be in place and in constant communication/integration with one or more enterprise systems. These types of interactions are largely automated data sync operations, process and result reporting operations, logging operations, and real time management operations. A single business process may contain many smaller operations, each operation dependant on one or more communication events. The proactive and adaptive portions of the system of the invention are also used in everyday business processing in order to streamline and refine processes and to make them adaptive to events that may affect some B2B operations.

Internal system messages are automated system-to-system or even machine-to-machine messages that can be in the form of automated instant messaging (IM) or other machine-readable messaging. Workforce management applies to this type of event. Workforce management is largely automated and system-to-system messaging for example, from a load balancing system to a group of agent machines may be used to convey workforce re-assignment duties according to current event loads. Moreover, when agents first log into the enterprise system workforce messaging may be used to assign initial communication center duties. The system may also infer the presence of enterprise employees by monitoring their usage of different channels.

The ability to trigger automated outbound events involves dynamic generation of interaction models that define a pending interaction in terms of the object class, type, and attributes. Attributes include contact parameters, media type or types, connection parameters, and content text or voice attributes. In some cases, outbound events are automatically triggered that will involve live interaction over voice or interactive text channels. Content then is added dynamically during interaction. An interaction is defined for the purpose of this specification as a dynamic state between at least 2 parties using one or more media types.

Proactive contacts can be part of a defined process or can be added to the model dynamically based on the occurrence of some event. The contact parameters, media types selected, and media channel parameters are all dynamically-added attributes that are determined based on known information. The intelligence required to model and trigger proactive events is a compilation of enterprise rules and aggregated information that defines client state and business state. As events occur that effect an area of business, proactive scenarios are dynamically modified to reflect new interactions necessitated by the change in state.

In some embodiments unforeseen changes may happen that are not defined as possible states in any vertical applications. Manual intervention may in some cases be required to incorporate the new state possibility into the appropriate business model portion so that the next time the particular state occurs proactive scenarios can dynamically occur. However many perceived states of business can be modeled as possible attributes of related applications. One example would be perceived product shortages that would affect customer-shipping parameters. A shortage of an amount for any shippable item that is greater than a defined amount (stock buffer) could be a modeled state that if detected could trigger automatic proactive contacts to all customers expecting shipment at the time of the state of business change.

Referring now back to FIG. 1, interaction server 109 or access resource interface 116 (optional embodiment) maintains a current state of availability of all media-based resources available to all active agents and automated systems logged into the enterprise network. This state is also used in routing determination for incoming events. The system enables agents themselves to subscribe to resource views of other agents for collaboration and event transfer purposes. For example, one agent may be involved in an interaction with a client using IP voice and during the interaction decides that a technical document needs to be transmitted to the client. But the current bandwidth available to the agent is less than optimal while interacting with the client over the IP voice channel. The agent can "view" the IP bandwidth availability of other agents and can initiate a message to another agent with optimum bandwidth availability to send the document to the customer while the agent is conversing with the customer. There are many other possible scenarios.

Proactive Client/Center Business Flow Chain

Figure 5:
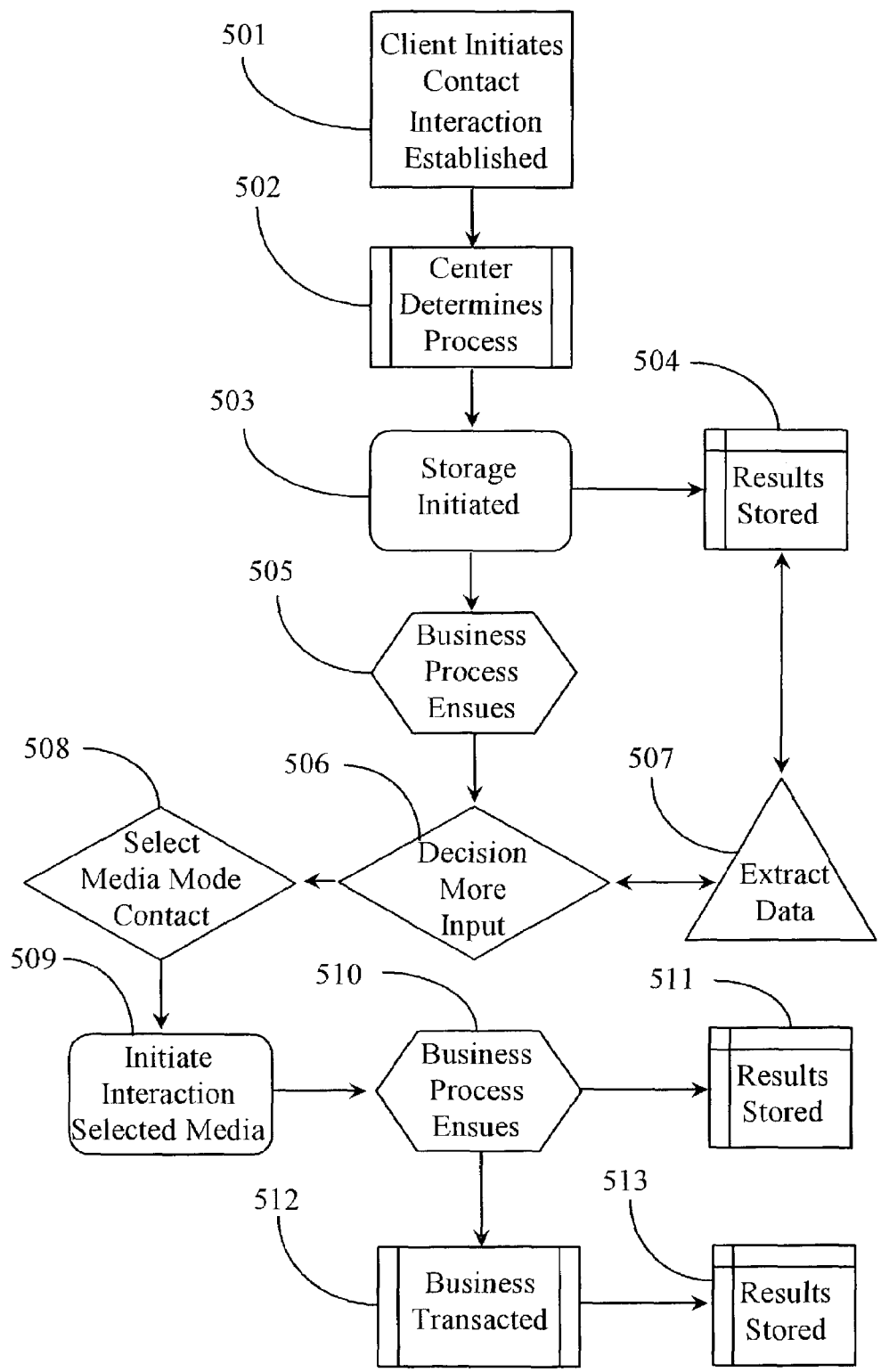
FIG. 5 is a process flow diagram illustrating a proactive client/center business flow chain according to an embodiment of the invention.

FIG. 5 is a process flow diagram illustrating a client/center business flow chain with a proactive contact according to an embodiment of the invention. At step 501, a client initiates a request for contact. The client of step 501 may initiate the contact according to any available media. Interaction is created at this point, so statistics stored may reflect the entire life of the interaction. The request is received within the center at a virtual multimedia queue analogous to queue 113 described with reference to FIG. 1. The reason for the request is determined by the center system at step 502. For example, if the request is a COST telephone call, the IVR system interacts with the client before routing to determine the reason for the call and to solicit any additional information that is deemed appropriate. Other media types lend to other known methods for determining the reason for the request before routing. For example, e-mails may be parsed and Web-forms are dedicated to a particular process.

At step 502, the center determines the process that reflects the client intent. It may simply be an order or an availability request. It may be, for example, a loan request or a service inquiry. The system matches the client intent with a known micro flow. In some cases the process identified may be an automated process with no agent interaction. In other cases the process will include live interaction. Resource availability is determined and routing to a final destination is performed.

At step 503, if the media type of the interaction is live voice, interactive text-based, or asynchronous messaging, the interaction content and any results are stored at step 504. At step 505 the business process ensues, meaning that interaction is still ongoing and the purpose of the client has yet to be satisfied. It is noted herein that further routing, re-direction, transfers, and other steps may be part of the process. Further, the entire interaction chain is captured and recorded as it occurs. It is further noted that the end of a process does not necessarily mean the closing interaction of a transaction. The definition of process may include, for example, post-closing operations that still need to be performed.

At some point in the process (step 506), the system makes a decision that more input from the client would be required to complete the process according to the client's original intent. This decision may be made on some time parameter that expires without a completion of the process. It may be a proactive decision based on some enterprise-known event that has occurred between the time of step 501 and step 506. One example would be locking in an interest rate in a mortgage application process. The lower rate was detected by the system and the decision was made to give the client an opportunity to lock in the new rate.

At step 507, client contact object (preferred contact set) is extracted from a history-based data store analogous to HDM described with reference to FIG. 1 above. The extracted data may be the contact information that was determined to be the optimal information given some criteria or set of criteria that reflects a current client state. For example, at the time of the proactive decision the client is likely at his workplace. The contact parameter set for the client's workplace is then extracted.

At step 508, the system selects a media mode or channel for initiation of the proactive contact. This selection may be an adaptive selection based on history data reflecting a series of contact attempts made at the client workplace using several different media types. Also the client may have a preferred contact media type listed as a prioritized media for workplace contact. If so then the etiquette rule may override a media selection if it is other than the listed media type or preference.

At step 509, an automated proactive contact is initiated using the selected media type. For a simple message notifying the client of a new lower interest rate, it may be that a simple outbound notification e-mail or instant message in generated. Content parameters and intended purpose of a proactive contact may also determine in part which media will be selected for the contact and whether the contact will be synchronous or asynchronous.

At step 510, the business process is still open and ensues. At step 511 results of new interaction of steps 509 and 510 are stored. It maybe that the client locked in the new rate and subsequently submitted the required paperwork or on-line document with a signature. In such as case then the process may be considered closed from the client and from the enterprise perspective. Therefore the business process is transacted or completed at step 512. Results of the transaction are stored at step 513.

In some cases, the transaction or process may not be complete until other steps are processed after the client has confirmed and submitted all requirements for the transaction. Further steps such as delivery of the service or product to the client and post transaction interaction regarding follow-up surveys or inquiries may be part of the process, in which case more steps would be required and further proactive measures may be made. As well, the process outlined in this example may resolve to a separate process that deals with post closing issues.

It is noted herein that if the proactive decision to contact a client uses live media with agent participation, the target agent would receive the event as an incoming event of the selected media type. The agent would also be notified with separate mechanisms, if appropriate, ahead of actual communication with the agent being established so that he or she may familiarize himself or herself before interacting.

It will be apparent to one with skill in the art that there may be fewer or more steps including sub steps illustrated in this example without departing from the spirit and scope of the present invention. The exact number and order of steps is dependent entirely on the nature of the modeled process, any occurring events that might trigger proactive customer care or contact, and the types of media used.

Proactive Supplier/Center Business Flow Chain

Figure 6:
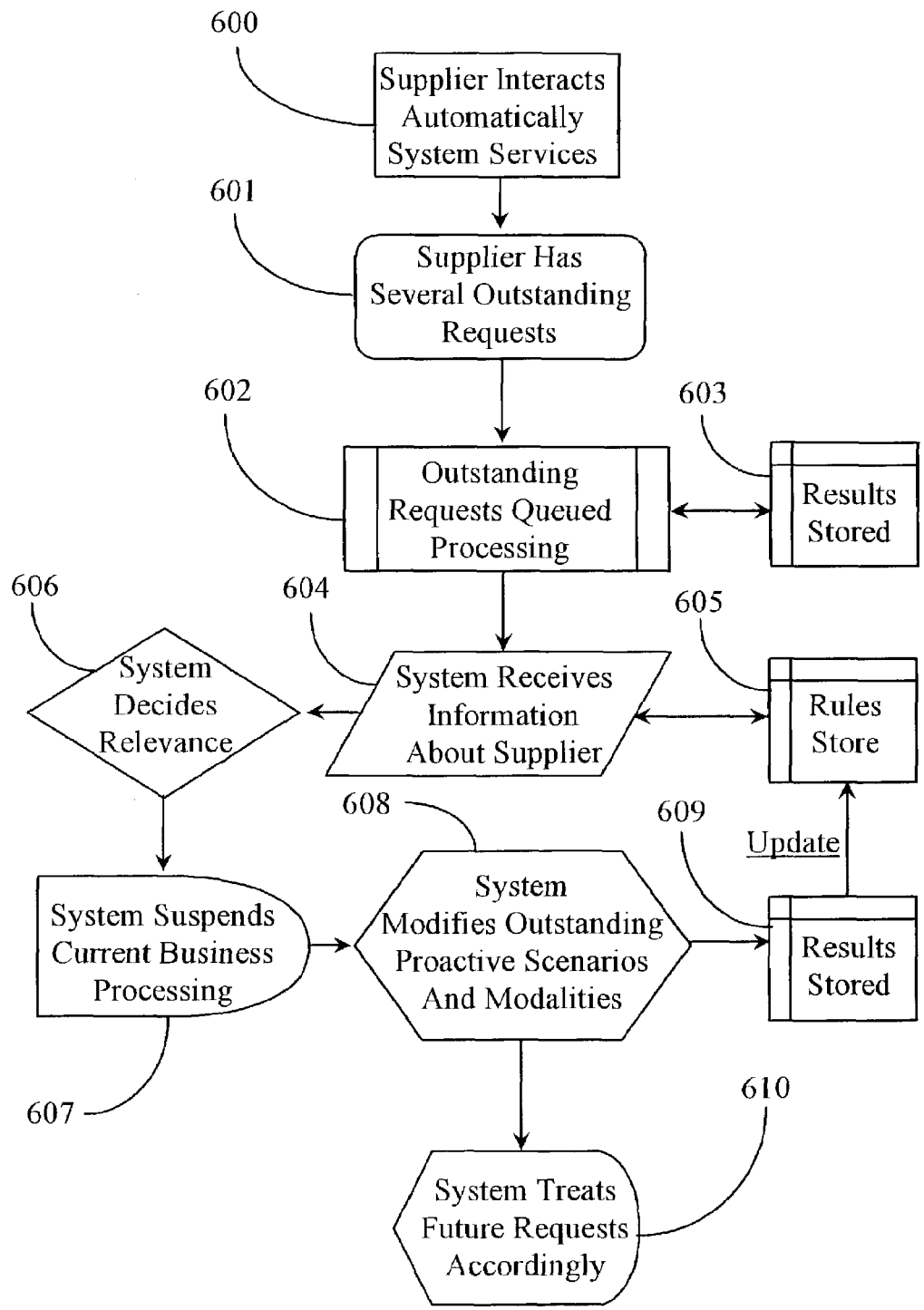
FIG. 6 is a process flow diagram illustrating a proactive supplier/center business flow chain according to an embodiment of the invention.

FIG. 6 is a process flow diagram illustrating a supplier/center business-flow chain with a proactive scenario according to an embodiment of the invention. At step 600 a supplier interacts automatically with enterprise system Web-services from an external server. Typically such services are established between an enterprise and supplier to carry on standard and ongoing business including any reporting requirements.

During Web-service interaction there will be several outstanding requests lodged at any given time (step 601) wherein the requests require some response action from the enterprise. Requests at step 601 may actually relate to one or more processes ongoing between the enterprise and the supplier and may be made through one or more Web-service interfaces.

At step 602 outstanding requests are queued for processing in a queue analogous to queue 113 described with reference to FIG. 1 above. At step 603 the content and any results of request processing are stored. The type of B2B request and response interactions are largely if not wholly automated and happen in the background of enterprise primary functions.

Assume that an event related to the suppliers business or directly involving the supplier itself occurs and becomes known to the enterprise as illustrated at step 604. The event could be related to the supplier's state of business and may affect any outstanding requests pending resolution within the enterprise. At step 606, the system decides if the event has relevance to the ongoing business being conducted between the entities. At step 605, the system consults with a rules database to help determine relevancy decided at step 606.

If the nature of the event is relevant to ongoing business and will affect at least one or more processes ongoing between the two entities, then at step 607 the enterprise system suspends any current business processing and any outstanding requests at least related to identified processes that are affected by the event.

Depending on system determination and process rules at step 608 the system modifies all outstanding proactive scenarios and modalities used in responses to the supplier. This may include canceling of some services and modification of other services including modification of interaction requirements. All results are stored in step 609 including updates of any new rules that are created for future interaction with services that are not suspended or cancelled.

At step 610 the system treats all future interactions with the supplier according to the new rules for interaction until a new event is detected that may neutralize or nullify the previous event. It is noted herein that some events are predictable such as a change in universal credit rating or a dip below a specific value in stock trading. Of course some events may be unforeseeable and may require some manual intervention to incorporate the event parameters into the enterprise rule system before service modification and changes in interaction rules are updated.

An example of an event that is predictable and that could affect business processes ongoing between two organizations would be a bankruptcy event. Service and rule modifications can be modeled as attributes and be dynamically incorporated into the business model portion that governs business between the two entities.

System Adaptation to a Business Process

Figure 7:
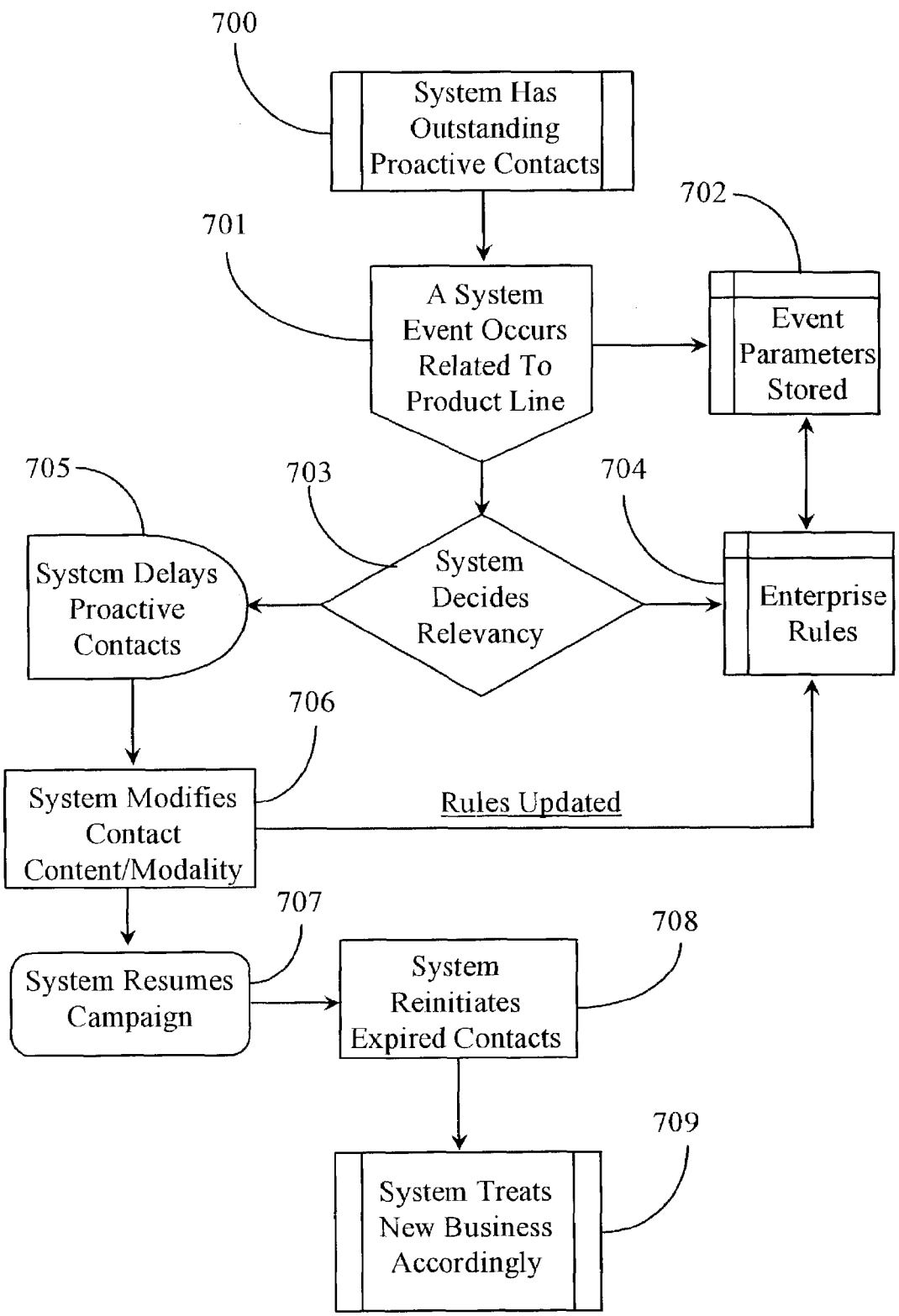
FIG. 7 is a process flow diagram illustrating a system adaptation to a business process affected by an unscheduled and related business event known to the system according to an embodiment of the invention.

FIG. 7 is a process flow diagram illustrating a system adaptation to an outbound campaign affected by an unscheduled but related business event according to an embodiment of the invention. At step 700 the system is engaged in an outbound proactive customer care campaign and has outstanding proactive contacts yet to be made. At step 701 a system event occurs related to, perhaps a product line that is the subject of the proactive campaign to customers who have received and who soon will be receiving one or more products affected by the event.

At step 702 parameters of the event are stored. The event could be for example, a feature cancellation related to a specific product in a product line, the product on order for each of the customers of the campaign. The system decides relevancy of the event at step 703 by consulting a rules base at step 704. Assuming in steps 703 and 704 that the system determines that the event will affect the current proactive customer care campaign, at step 705 the system delays proactive contacts and suspends any that are in queue.

At step 705, the system modifies the contact content and modality if required of the information that is central to the campaign. If necessary, the results of the modification are updated to the rules base (Rules Updated). Perhaps due to the event, a previous asynchronous media selected for the campaign cannot now be used because the change in the product is something that lends to possible order cancellations or switch orders to a non-affected product of the product line that still has all of the basic features of the ordered product including the new feature.

At step 706, the system modifies contact content and modality. A primary media selection is now classified as synchronous interactive media preferred with asynchronous media if no synchronous media is available. Essentially this means that the system will attempt contacting customers using interactive media if available like telephone, cellular phone, voice over IP, and so on. If due to customer state at the time of contact, the preferred media is unavailable then an available asynchronous media like e-mail or page will be selected.

After all of the rules are updated and the new rules for the campaign are established then the system resumes the campaign. This may include regeneration and re-queuing of outbound contacts to correct misleading information that may already have been sent during the campaign at step 708. At step 709, the system treats any new proactive customer care campaigns dealing with the same product according to the new rules related to the product in question now being offered without the eliminated feature. It is noted herein that the proactive care campaign was altered in intent and purpose due to the system event but that change does not affect customers who have not already ordered the product thinking that the feature was provided. Therefore future customers that order are made aware of the lack of the feature before ordering and their proactive campaign contacts can be conducted normally.

Steps for Dynamic Outbound Interaction Management

Figure 8:
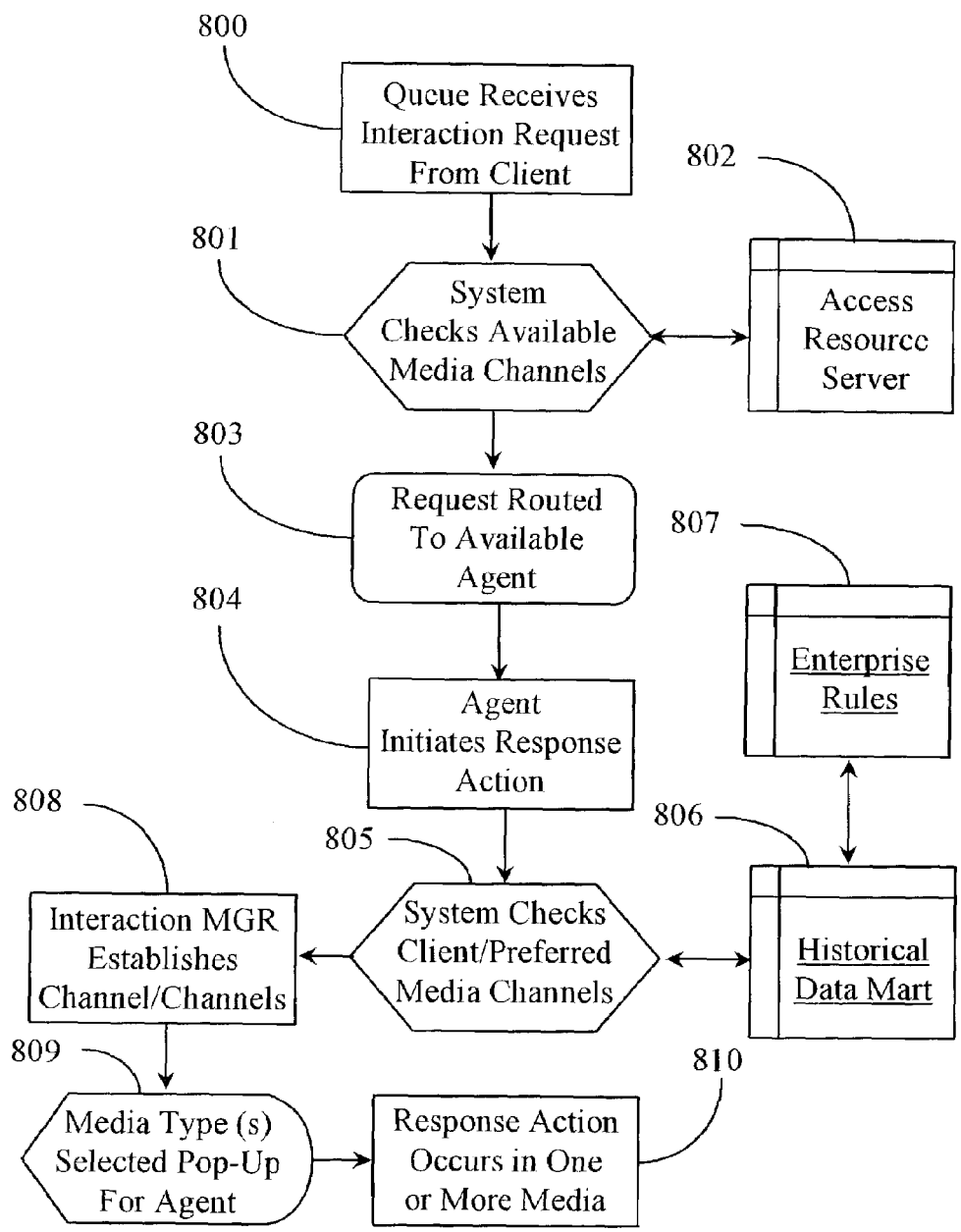
FIG. 8 is a process flow diagram illustrating steps for dynamic outbound interaction management according to an embodiment of the invention.

FIG. 8 is a process flow diagram illustrating steps for dynamic outbound interaction management according to an embodiment of the invention. At step 800 the enterprise system receives an event from a client in a multimedia queue analogous to queue 113 described with reference to FIG. 1. The event may be a COST telephone call waiting notification or any other type of routable media event.

At step 801 the system during routing determination checks available media channels of agents and systems that match the incoming event by consulting with access resource server at step 802. Other routing determinations are incorporated such as skill-based considerations and so on. If for example, the event is a COST telephone interaction, then consulting with the resource server will show all agents having an available COST telephone active.

After routing criteria is determined at step 803 the event is transferred to an available agent according to the media type of the event. After the interaction with the agent, at some point the agent initiates a response action at step 804. The original interaction may have been a COST telephone interaction, for example. However the agent may need to respond at a latter point with additional information requested by the client that could not be obtained at the time of the call. Therefore a proactive contact is needed.

At step 804, the agent decides that a response using an additional media channel other than telephone needs to be delivered to the customer at some point after the original interaction. The agent initiates a response or outbound contact at some point after the original interaction. The initiated event does not necessarily have any media assignments at the time of initiation but the intent or purpose of the initiated contact is made known by the agent for media selection purposes. For example if the agent has decided exactly what media type should be used then that media type will be selected. Some types of content, for example, demand specific media types. On the other hand, if the agent is not sure which media type should be used and more than one type can be used then the system can make the selection based on a type of information the agent wishes to send and other criteria.

At step 805 the system checks any preferred media type for contact and/or the success statistics related to past contacts using the available media types accessible to the client. Step 805 is aided by a step 806 wherein the system accesses a historical data mart analogous to HDM within facility 114 described with reference to FIG. 1 above. Statistically, a specific type of media type available to the client may have the best historical record of success in response from the client when used. In one embodiment weight factors may be assigned to all of the client media types so that the most successful types are always chosen if their weight values dictate at the time of contact initiation. Client preferred media including etiquette rules might be considered as well as any alternate sets of client contact media types that may be applicable if the client moves from a primary location to another location.

Selection of the media type for the agents response information is preferably directed so that contact is guaranteed without pestering the client by duplicating information to the client using more than one media type available to the client. In this way the client receives information without being pestered with multiple copies or notifications of the same information.

At step 808 an interaction manager within an interaction server analogous to server 111 described with reference to FIG. 1 above establishes the media type or media "channel" that will be used to interact with the client. The media type selected will, if a DNT type media, "pop-up" on the agents screen at step 809 with the client address and in some cases subject description and some content for the agent to complete the information and send the information. For example, if the media type selected is e-mail, then the e-mail application of the agent executes to the point of the message ready screen having the send to address and possibly any CC and BCC addresses inserted as well. If the media selected is a COST telephone channel then the system would place the outbound call and when the client answers the call the system would transfer the call to the agent as an inbound interaction. An agent may override this automated media type selection process, for example, if the client and the agent had agreed which media type to use to send the information.

At step 810, the response is executed and concluded in the media type selected and the agent can then close the transaction. Some media types selected will execute as inbound interaction events from the viewpoint of the agent. In this case, a pop-up window can be directed to an agent GUI informing of the incoming event and reminding of the event purpose. If the selected media is a notification type media that does not require agent participation such as an automated fax or automated e-mail wherein the content and subject matter is routine then the agent simply initiates the outbound contact by indicating a proper message or notification code and the system can still make a media selection for the automated message among more than one automated system at work in communication center.

In one embodiment of the invention, during interaction with the client at step 803 the agent may also add interaction media types to the current session. Traditionally this is a concerted effort between client and agent discussed at length during the open session and not always successful because of miss-communication or wrong execution maneuvers such as not properly executing a conference call so as to successfully add a third party to the session. However, using the interaction server and if required the media selection manager, the agent may initiate, for example, a co-browsing session while interacting with the client by telephone.

One with skill in the art will recognize that in some instances media types and other executions such as event transfers, conference in to session, and so on may be agent-directed with the agent already set on the media type and content parameters. In this case an agent may fully override the interaction management system in terms of media channel selection. However event transfers and conferencing in are still subject to agent and media type availability. During attempts to add more media types and participants to a session, the interaction management system may still make recommendations to agents as to other available media types and resources which can be used for the intended purpose. There are many possibilities.

Steps for Dynamic Inbound Interaction Management

Figure 9:
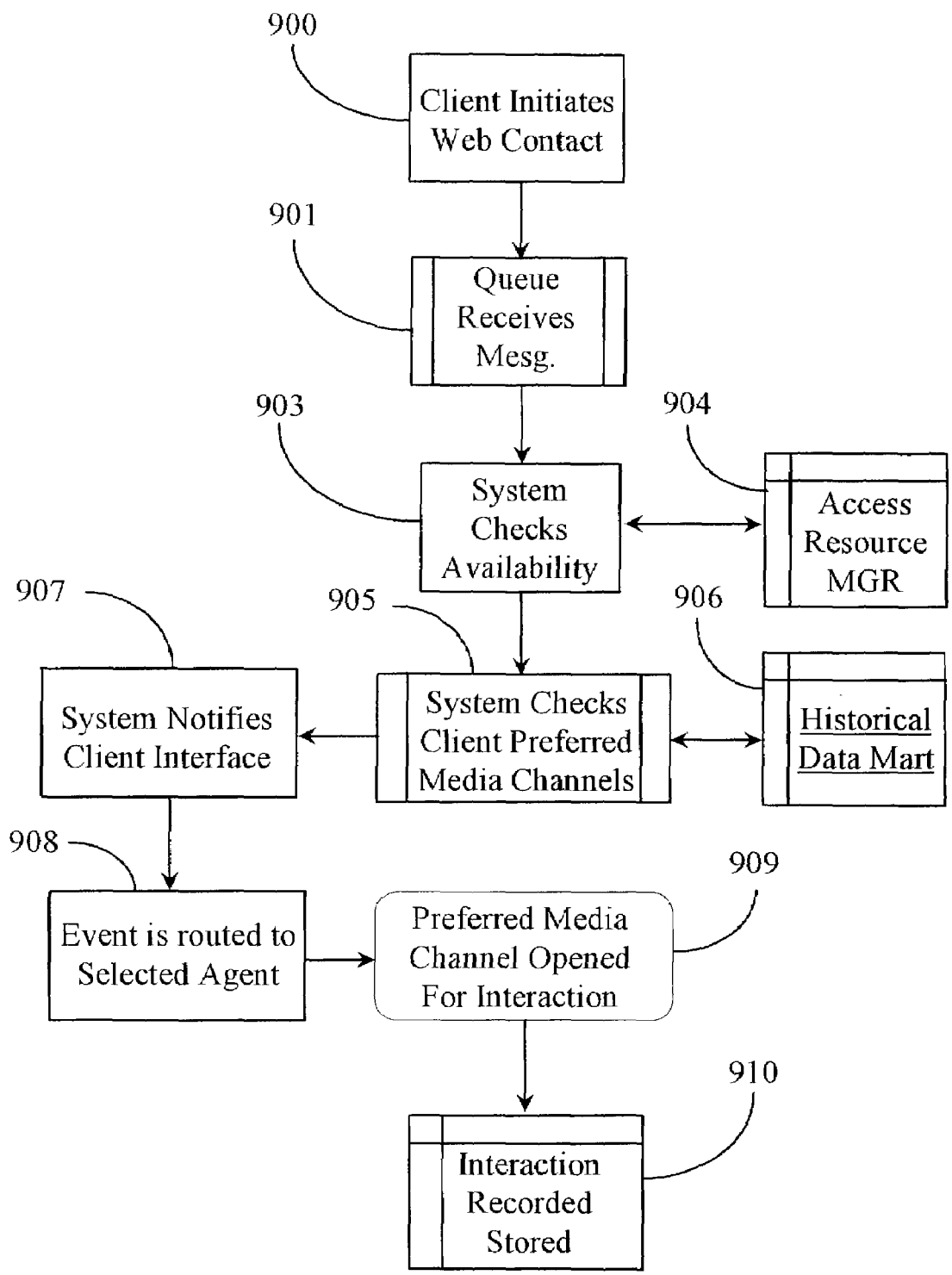
FIG. 9 is a process flow diagram illustrating steps for dynamic inbound interaction management according to an embodiment of the invention.

FIG. 9 is a process flow diagram illustrating steps for dynamic inbound interaction management according to an embodiment of the invention. At step 900 a client initiates a Web-contact request through a Web-service or client interface maintained by the enterprise. The client may be a single customer or a business client. The contact vehicle is essentially a Web form requesting contact where a media type for contact is not specified. The purpose and intent, subject matter of request, order number, and other information may be required on the form. Traditionally, web-forms order a specific media type for contact or response back. According to an embodiment of the present invention the decision of which media type to use is system-decided.

At step 901 a queue system analogous to HPMMQ 113 described with reference to FIG. 1 receives the request. The request is analyzed for intent and purpose for possible media types that can be used to satisfy the request. At step 903, the system checks availability (routing, media types) with the aid of a step 904 for consulting with an access resource manager analogous to access resource server 116 described with reference to FIG. 1 above. The system is concerned at this point in identification of available agents with the skills and media types available that could satisfy the request. At step 905 the system checks client preferred media channels or types and any etiquette rules and so on. This step is aided by step 906 for accessing the historical data mart described previously in this specification.

At step 907, the system contacts the Web-server interface of step 900 and indicates a selected media type for interaction. The indication may simply say that "an agent will contact you shortly by way of COST telephone", or "you will shortly receive an invitation for a co-browsing session". This assumes of course that the request involves live interaction and that the agent will initiate the contact. The service can be activated and offered through a Web-server acting as a proxy or at the client-end node through an installed client application.

The client event does not lose it's place or priority in queue and the media type and contact parameters including selection of an agent for the interaction are all decided while the event waits in queue. The event "takes shape" while waiting in queue. At step 908, the event is routed to the selected agent in a form dependent on the media type used. At step 909, the agent receives the interaction in the media type selected. For example, if the media type is a COST telephone call then the agent's telephone would ring as an inbound interaction. At step 910 all interaction between the client and agent is recorded and stored for record and are recoverable.

One with skill in the art will appreciate that there may be more or fewer steps included in the process described in this example without departing from the spirit and scope of the invention. One variable is selected media type, which depending on the exact type used may affect the number of steps in the process.

What is claimed is:

1. An object-oriented system for managing interactions of multimedia types in a communication center environment including one or more of a communications center, a telephony network, the Internet network, and a wireless access network, the system comprising:

a multimedia queuing system for queuing inbound, outbound, and internal communication events;

a processor for processing events in the queue;

an interaction server for selecting media type or types for a pending interaction or notification event;

a resource manager for reporting agent availability in terms of media types available to the agent; and a data store for storing client information about media types available to the client and historical information about success of past use of those media types;

characterized in that the system processes and routes incoming events of known media type to access points defined as systems or agents based in part on media channel availability of the access point, the availability states reported to the system by the resource manager and wherein the system selects the media channel for certain events in queue that are not pre-dedicated as specific media type events, and wherein the system overrides a media preference of a client in routine an event to an access point or in delivery of an outbound proactive event to the client.

2. The system of claim 1 wherein the interactions comprise interactive sessions of more than one media type between an access point and one or more clients.

3. The system of claim 1 wherein the interactions comprise interactive sessions of more than one media type between one or more access points and a single client.

4. The system of claim 1 wherein the interaction server triggers automatic outbound proactive events queued for delivery to clients at predefined steps of a modeled business process to which the clients are party.

5. The system of claim 4 wherein the events are triggered according to detection by the system of occurrence of a business related event or intercept or receipt of knowledge of a business related event that may affect outcome of a business process.

6. The system of claim 1 wherein the access point adds a media type or media types to a current interaction, the addition thereof processed in queue as an outbound event or events of the media type or types.

7. The system of claim 1 wherein a modeled business process defines a generic series of required events for completing a transaction the modeled process becoming a personalized transaction through dynamic application of contact parameter objects, media type objects for defined events, and assigned access point objects, the contact objects and access objects defining parties to the transaction.

8. The system of claim 1 wherein media channel selection includes selecting more than one media type for an interaction or notification event.

9. The system of claim 1 wherein all of the events queued are virtual events of unassigned media and all event processing including media assignment is performed while events wait in queue.

10. In a communication center environment including one or more of a communications center, a telephony network, the Internet network, and a wireless access network, a method for initiating a proactive event deliverable to a client, the event automatically assigned a preferred media type comprising steps of;

(a) recognizing a need for contacting the client during transaction of a business process that the client is party to;

(b) generating a generic event object having client identification data and intent or purpose data for the event;

(c) queuing the event for further processing and delivery to the client;

(d) consulting a data store having information about media types available to the client and historical information about success of past use of those media types, and determining which supported media type or types the event will be presented in;

(e) attaching the media type or types parameters to the event;

(f) executing the event for delivery, and (g) overriding a media preference of the client in delivering the event.

11. The method of claim 10 wherein in step (a) a specific point in the process for contacting a client or clients is pre-set and a generic step in the process.

12. The method of claim 10 wherein in step (a) a step for contacting a client or clients is inserted into the business process as a result of system intercept or knowledge of an event related to the outcome of the process.

13. The method of claim 10 wherein in step (b) the generated event also included source data.

14. The method of claim 13 wherein the source data is agent or system identification data.

15. The method of claim 10 wherein in step (b) the event is generated by an interaction server on behalf of a specific access point, the access point being an agent or automated system.

16. The method of claim 10 wherein in step (c) the queued event is one of an outbound event or an internal event.

17. The method of claim 10 wherein in step (e) an interaction server attaches the media parameters to the event.

18. The method of claim 10 wherein in step (e) event execution is automatic when all required contact parameters and media parameters are attached.

19. The method of claim 10 further comprising a step (f) for automated execution of applications related to an attached media type or types owned by one or more access points associated with event delivery, the application or applications opened enabling immediate interaction with the recipient.

* * * * *